United States Patent
Praskovsky et al.

(10) Patent No.: US 8,770,649 B2
(45) Date of Patent: Jul. 8, 2014

(54) DEVICE, ASSEMBLY, AND SYSTEM FOR REDUCING AERODYNAMIC DRAG

(71) Applicants: Alexander Praskovsky, Lauderdale by the Sea, FL (US); Eleanor Praskovskaya, Lauderdale by the Sea, FL (US); Andrew Praskovsky, Lauderdale by the Sea, FL (US)

(72) Inventors: Alexander Praskovsky, Lauderdale by the Sea, FL (US); Eleanor Praskovskaya, Lauderdale by the Sea, FL (US); Andrew Praskovsky, Lauderdale by the Sea, FL (US)

(*) Notice: Subject to any disclaimer, the term of this patent is extended or adjusted under 35 U.S.C. 154(b) by 0 days.

(21) Appl. No.: 13/648,720

(22) Filed: Oct. 10, 2012

(65) Prior Publication Data

US 2013/0106135 A1   May 2, 2013

Related U.S. Application Data

(60) Provisional application No. 61/553,178, filed on Oct. 29, 2011, provisional application No. 61/694,825, filed on Aug. 30, 2012.

(51) Int. Cl.
*B62D 35/00* (2006.01)
*F15D 1/10* (2006.01)

(52) U.S. Cl.
CPC .............. *F15D 1/10* (2013.01); *B62D 35/001* (2013.01)
USPC .................................... 296/180.1; 296/180.4

(58) Field of Classification Search
CPC .......................................... B62D 35/00–35/02
USPC .................... 296/180.1–180.5, 217; 180/903; 105/1.1, 1.2
See application file for complete search history.

(56) References Cited

U.S. PATENT DOCUMENTS

| | | | |
|---|---|---|---|
| 3,591,229 A * | 7/1971 | Wilfert et al. | 296/91 |
| 3,997,132 A * | 12/1976 | Erwin | 244/199.3 |
| 4,298,089 A * | 11/1981 | Birch et al. | 181/213 |
| 4,359,997 A | 11/1982 | Lyssy | |
| 4,455,045 A * | 6/1984 | Wheeler | 296/181.5 |
| 4,655,419 A | 4/1987 | van der Hoeven | |
| 4,750,772 A | 6/1988 | Haegert | |
| 4,836,151 A | 6/1989 | Litjens et al. | |
| 4,863,213 A | 9/1989 | Deaver et al. | |
| 4,932,716 A | 6/1990 | Marlowe et al. | |
| 4,962,642 A | 10/1990 | Kim | |
| 5,058,837 A | 10/1991 | Wheeler | |
| 5,058,945 A * | 10/1991 | Elliott et al. | 296/180.5 |

(Continued)

FOREIGN PATENT DOCUMENTS

WO   WO2005/100752   * 10/2005

*Primary Examiner* — Dennis H Pedder
(74) *Attorney, Agent, or Firm* — Laurence A. Greenberg; Werner H. Stemer; Ralph E. Locher

(57) ABSTRACT

A system and methods for reducing aerodynamic drag and mitigating detrimental side wind effects on vehicles moving through air or water with a plurality of new subsystems disposed in a plurality of locations on the vehicles. Each one of the subsystems includes a sub-set of small-scale vortex generators that have an intake for air from airflow around the vehicle and that produce intensive small-scale vortices with large lifespan, and/or a new fairing device that streamlines airflow and produces a sheet of small-scale-vortices. The subsystems direct the vortices with large lifespan and/or sheets of vortices into the vehicle's drag-producing volumes. The vortex generators have one or several air channels preventing airflow from bypassing vortex-producing elements and the elements inside the channels that produce small-scale vortices. The novel fairing devices are of bluff shape and/or with bluff obstructions and/or slots for generating sheets of intensive small-scale vortices in surrounding airflow.

6 Claims, 17 Drawing Sheets

(56) References Cited

U.S. PATENT DOCUMENTS

| | | | |
|---|---|---|---|
| 5,280,990 A | 1/1994 | Rinard | |
| 5,803,602 A | 9/1998 | Eroglu et al. | |
| 5,918,835 A | 7/1999 | Gerhardt | |
| 6,099,692 A | 8/2000 | Weisshuhn et al. | |
| D432,073 S | 10/2000 | Coyle | |
| 6,158,412 A | 12/2000 | Kim | |
| 6,224,141 B1 | 5/2001 | Brodlo | |
| 6,286,892 B1 | 9/2001 | Bauer et al. | |
| 6,286,894 B1 | 9/2001 | Kingham | |
| 6,309,010 B1 | 10/2001 | Whitten | |
| 6,349,761 B1 | 2/2002 | Liu et al. | |
| 6,427,948 B1 | 8/2002 | Capmbell | |
| 6,485,087 B1 | 11/2002 | Roberge et al. | |
| 6,491,260 B2 | 12/2002 | Borchers et al. | |
| 6,561,575 B2 | 5/2003 | Fairburn et al. | |
| 6,595,578 B1 | 7/2003 | Calsoyds et al. | |
| 6,685,256 B1 | 2/2004 | Shermer | |
| 6,702,364 B2 * | 3/2004 | Neel | 296/180.2 |
| 6,959,958 B2 | 11/2005 | Basford | |
| 6,979,049 B2 | 12/2005 | Ortega et al. | |
| 6,986,544 B2 | 1/2006 | Wood | |
| 7,192,077 B1 | 3/2007 | Hilleman | |
| 7,216,923 B2 | 5/2007 | Wong et al. | |
| 7,240,958 B2 | 7/2007 | Skopic | |
| 7,243,980 B2 | 7/2007 | Vala | |
| 7,255,387 B2 | 8/2007 | Wood | |
| 7,318,620 B2 | 1/2008 | Wood | |
| 7,431,381 B2 | 10/2008 | Wood | |
| 7,578,541 B2 | 8/2009 | Layfield et al. | |
| 7,585,015 B2 | 9/2009 | Wood | |
| 7,641,262 B2 | 1/2010 | Nusbaum | |
| 7,695,050 B2 * | 4/2010 | Neale | 296/180.1 |
| 7,740,303 B2 | 6/2010 | Wood | |
| 7,934,686 B2 | 5/2011 | Harman | |
| 8,079,634 B2 | 12/2011 | Visser et al. | |
| 8,196,995 B2 * | 6/2012 | Chen | 296/180.4 |
| 8,196,996 B1 * | 6/2012 | Campbell | 296/180.4 |
| 8,257,036 B2 * | 9/2012 | Norris | 415/208.2 |
| 2003/0205913 A1 | 11/2003 | Leonard | |
| 2007/0235590 A1 * | 10/2007 | Kokoshkin et al. | 244/130 |
| 2008/0061598 A1 | 3/2008 | Reiman et al. | |
| 2008/0121301 A1 | 5/2008 | Norris | |
| 2009/0146452 A1 | 6/2009 | Kjellgren et al. | |
| 2011/0175395 A1 * | 7/2011 | Guign et al. | 296/180.3 |
| 2013/0088039 A1 * | 4/2013 | Feight et al. | 296/180.2 |

\* cited by examiner

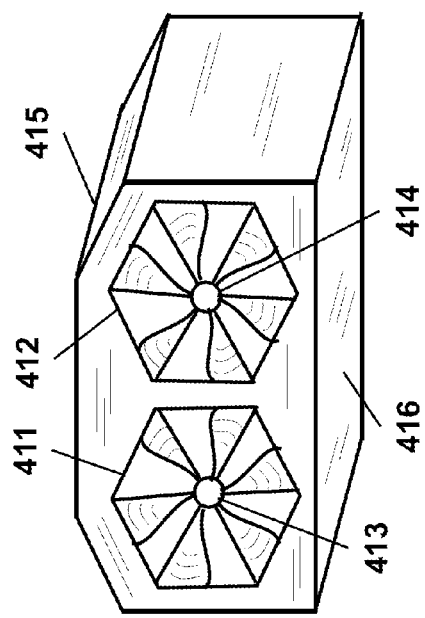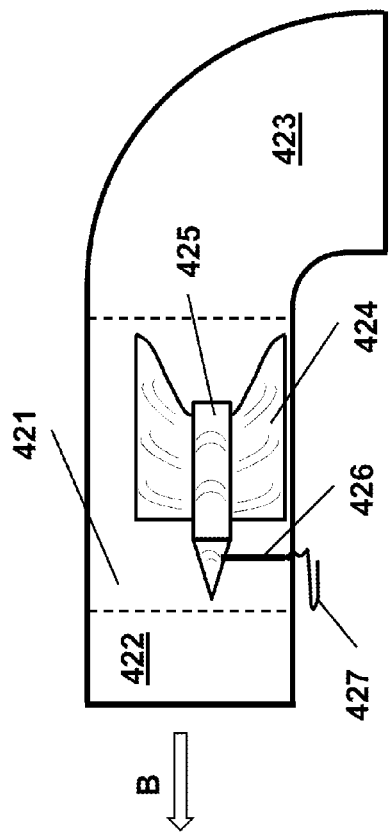
FIG. 4A
FIG. 4B

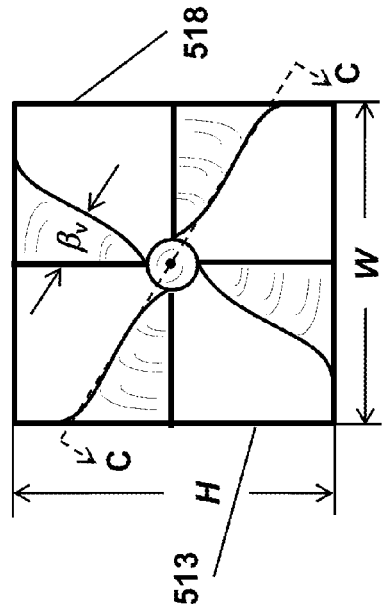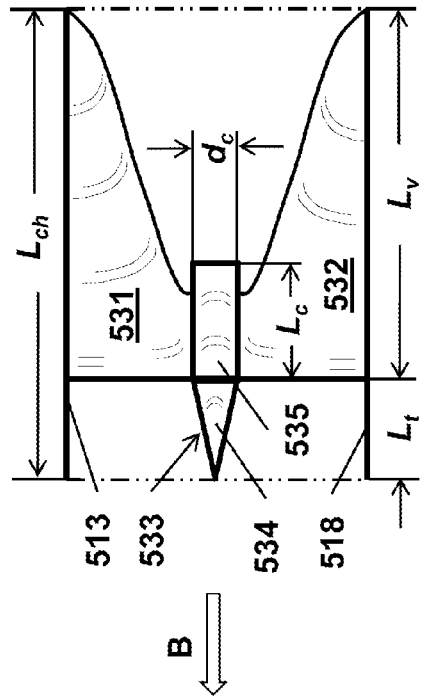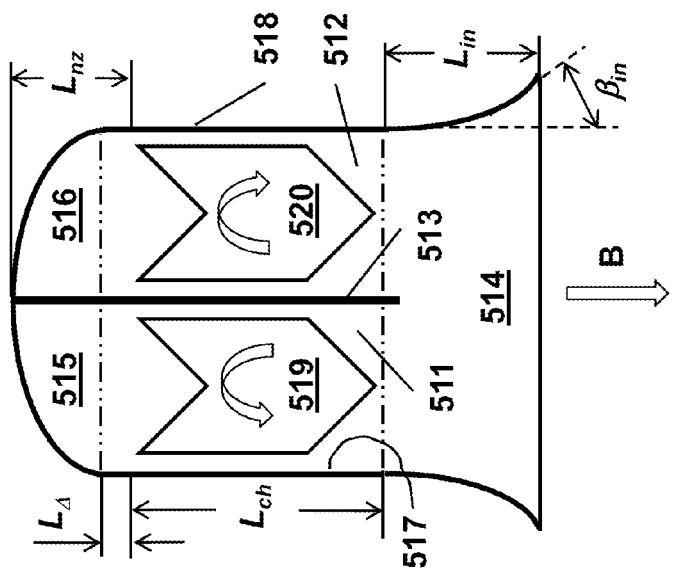

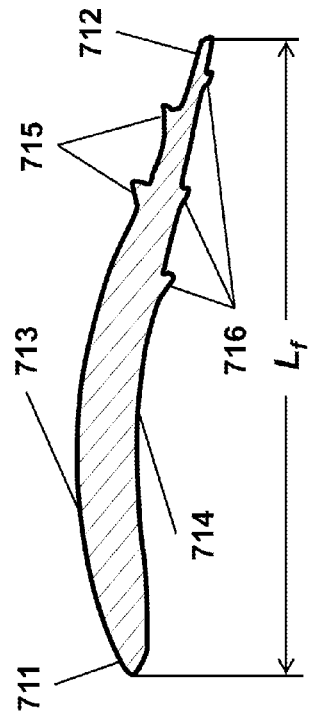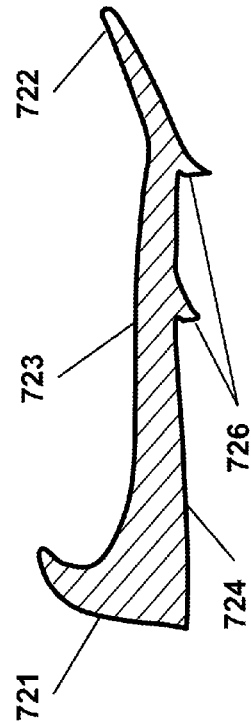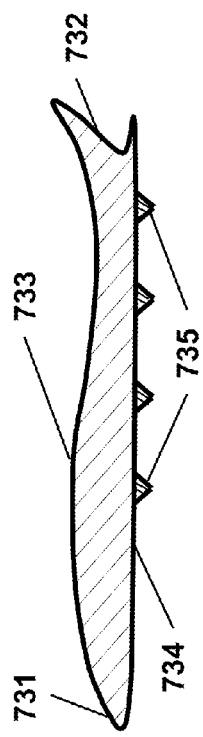
FIG. 7A
FIG. 7B
FIG. 7C

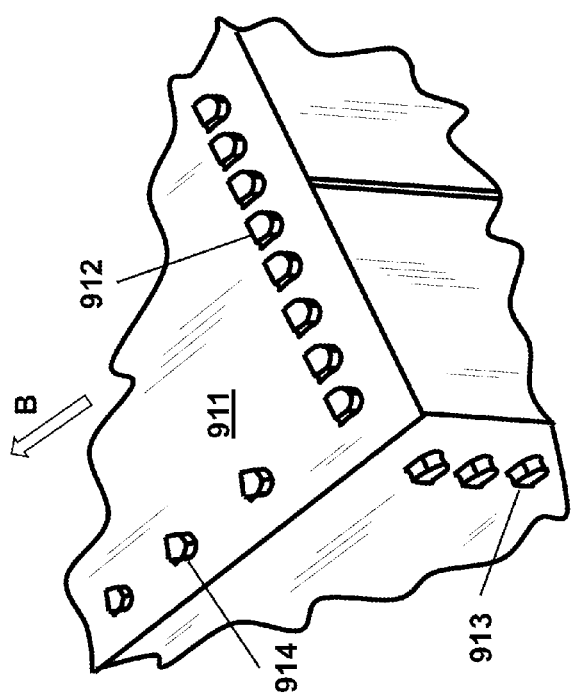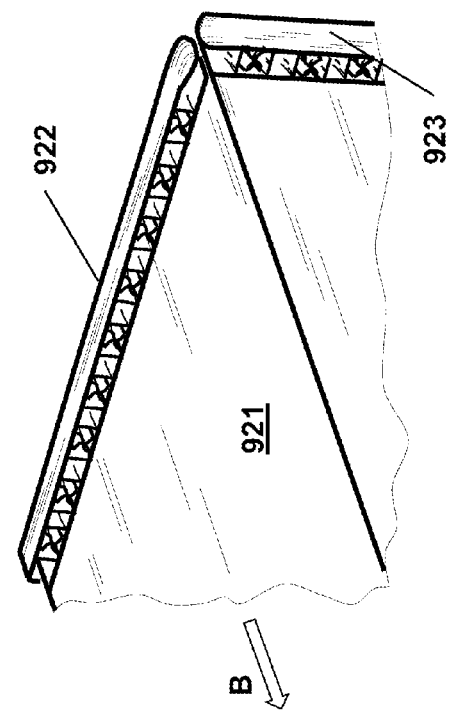
FIG. 9A
FIG. 9B

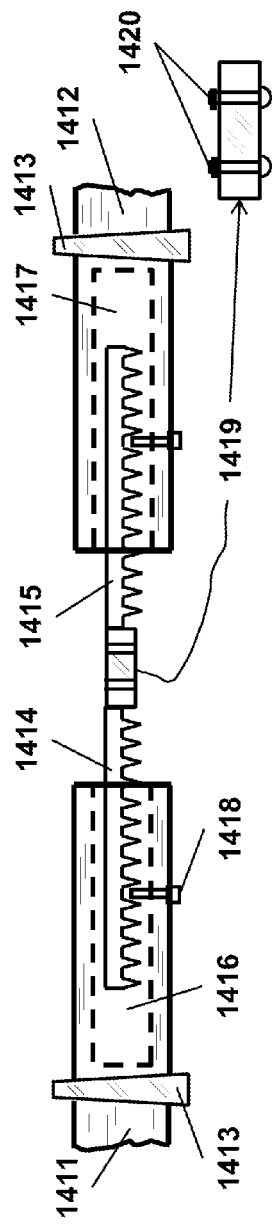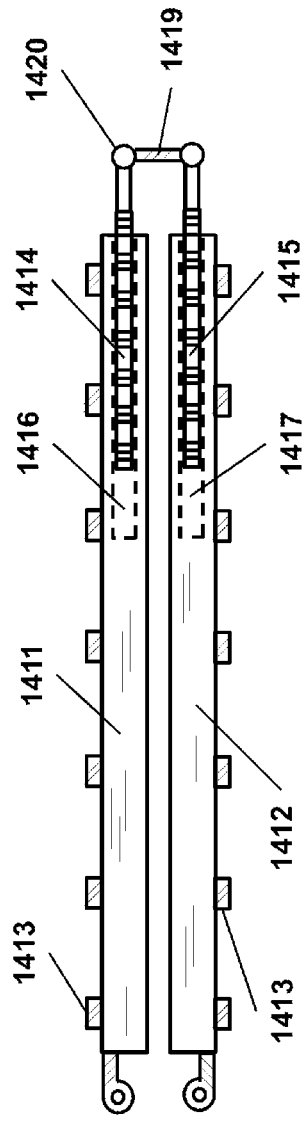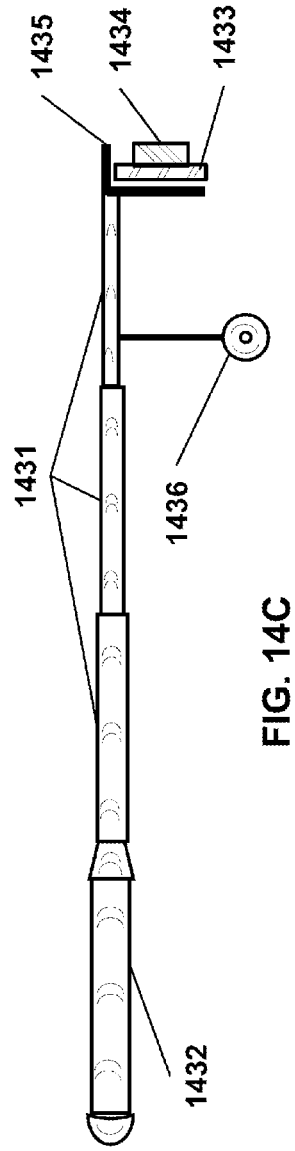

DEVICE, ASSEMBLY, AND SYSTEM FOR REDUCING AERODYNAMIC DRAG

CROSS-REFERENCE TO RELATED APPLICATION

This application claims the benefit under 35 U.S.C. §119 (e) of provisional patent application No. 61/553,178, filed Oct. 29, 2011 and of provisional patent application No. 61/694,825, filed Aug. 30, 2012; the prior applications are herewith incorporated by reference.

BACKGROUND OF THE INVENTION

1. Field of the Invention

The invention relates to a method, to a device, and to an assembly or system for reducing aerodynamic drag and mitigating detrimental effects of side wind on vehicles moving through air or water including but not limited to heavy cargo trucks, cargo containers, liquid cargo cisterns, buses, RV's, SUV's, vans, passenger cars, railroad cars, helicopters, airplanes, aerostats, ships and submarines, and, more specifically, to systems for introducing intensive small-scale turbulent vortices with large lifespan and/or sheets of small-scale-vortices into the vehicle's drag producing volumes. The invention also relates to attachable/detachable mounting of any devices on vehicles.

2. Description of the Related Art

In the context of the present invention, a vehicle is defined as any means for transporting people and/or cargo. The below description is focused on a specific application of the present invention to ground heavy cargo vehicles which is done for simplifying explanation of physical effects and major features of the invention. The description is as comprehensive as any person skilled in the art can apply the invention to any other vehicle that moves through air or water. The term aerodynamic drag, therefore, is to be understood to also refer to any fluid-dynamic drag.

With an increasing fuel cost, reducing fuel consumption by long distance cargo transport and other vehicles at a cruise speed became an increasingly important task and a diverse body of designs has been developed for reducing an aerodynamic drag of vehicles, mainly for large cargo trucks. Although the majority of efforts have been focused on reducing a vehicle drag for the cases of no wind or a head wind, a limited attention was also paid to reducing detrimental effects of side winds. The most important side wind effects include the increase in an aerodynamic drag of a vehicle at stable or gusty side winds and forcing a vehicle out of a traffic lane or overturning a vehicle by strong side wind gusts. Hereafter a side wind is defined as airflow around a vehicle at a non-zero yaw angle.

A standard cargo vehicle consists of a tractor and one or several cargo holding areas (containers) of any kind that are attached to a tractor or towed, referred below as trailers. As such vehicle moves along its path, airflow around the vehicle produces the aerodynamic drag and increases the fuel consumption. The major air drag-producing volumes are located in the front of a vehicle, on the sides of a vehicle, underneath a vehicle, in the gaps between a tractor and a trailer and between sequential trailers for combination vehicles, and on the back of trailers. The magnitude of aerodynamic drag increases significantly with increasing vehicle speed.

Modern trailers have a traditional parallelepiped shape with bluff edges for maximizing a cargo space. The front of modern tractors is typically of an aerodynamically efficient shape although the rear edges still have a bluff shape. Bluff rear edges are also typical for buses, RV's, railroad cars and some passenger SUV's, vans and cars. High air drag of bluff bodies compared to that of smooth bodies (also called aerodynamic bodies) is a well-known physical phenomenon.

The term "air drag" refers to the aerodynamic force acting on a vehicle and opposing its motion through the surrounding air. In general, such drag forces include friction drag (also called viscous drag) and pressure drag (also called form drag or profile drag). The physical basis for high air drag of bluff bodies at a high air speed is well-known. Due to the inertia, airflow around a bluff body cannot make a sharp turn and fill the space on the sides and behind a fast moving body, such as a tractor or trailer. It leads to flow separation on the bluff edges and creates a low pressure zone behind a bluff body and a pressure drop on its rear surface. Flow separation in front of a bluff body like a tractor windshield or a trailer front creates a high pressure zone and a pressure jump on its front surface. The difference in pressure between the rear surfaces and the respective front surfaces of a body creates the aerodynamic force acting against the body motion through surrounding air and this force is called the aerodynamic drag or air drag.

Air drag can be reduced by enhancing injection of air into a low pressure zone and/or by reducing a size of a separation zone. In accordance with Bernoulli's effect, a pressure drop on the rear surface and a pressure jump on the front surface of a bluff body decrease with decreasing the size of a respective flow separation zone.

A diverse body of devices has been developed for reducing air drag in drag-producing volumes in front and underneath motor vehicles, in the gaps between a tractor and a trailer and between sequential trailers for combination vehicles, on the sides of a trailer, and on the back of the trailers. Literally hundreds of patents for such devices have been awarded around the world for the last several decades. To enhance the efficiency of the previously invented devices, an application of several different drag-reducing devices in different location of the same vehicle has been suggested in many patents. The authors of the present invention do not intend to provide a comprehensive overview of all relevant patents but refer to typical examples of different drag-reducing devices for motor vehicles.

The majority of devices for reducing air drag for cargo vehicles are aimed at reducing the size of a flow separation zone and/or the pressure drop and/or the pressure jump inside the zone by streamlining airflow near bluff edges.

Modern tractors have aerodynamically efficient front profiles, high roof fairings and side cab extender fairings, for example U.S. Pat. No. 4,750,772 to Haegert, U.S. Pat. No. 4,932,716 to Marlowe et al., and references therein. Those means streamline airflow around a tractor body and reduce significantly its air drag.

The most widely used devices for streamlining airflow underneath cargo vehicles are aerodynamic skirts. Typical skirt configurations can be found, for example in U.S. Pat. No. 7,578,541 to Layfield et al., U.S. Pat. No. 7,740,303 to Wood, and references therein. Aerodynamic skirts streamline airflow around the drag-producing volume underneath a vehicle and reduce the vehicle's air drag.

Nose cones, front fairings and front deflectors are typically used for streamlining airflow around the trailer front; e.g., U.S. Pat. No. 5,280,990 to Rinard, the Patent application publication No. US 2008/0061598 by Reiman and Heppel, and references therein. Those devices reduce air drag in the gap between a tractor and a trailer and on the trailer roof and sides.

Another device for reducing air drag in the tractor-trailer gap are split plates, e.g., U.S. Pat. No. 6,986,544 to Wood, U.S. Pat. No. 7,318,620 to Wood and references therein. Instead of streamlining airflow, the plates split large turbulent vortices in the gap into several smaller ones which results in the drag reduction.

The largest fraction of the vehicle's air drag is concentrated in the trailer back and the majority of existing drag-reducing devices are focused on that drag-producing volume. The mostly used devices for reducing air drag in the trailer back are rear fairings, deflectors, boat tails, vanes and scoops. Representative examples of such devices can be found in U.S. Pat. No. 6,286,894 to Kingham, U.S. Pat. No. 6,309,010 to Whitten, U.S. Pat. No. 6,485,087 to Roberge et al., U.S. Pat. No. 6,595,578 to Calsoyds et al., U.S. Pat. No. 7,192,077 to Hilleman, U.S. Pat. No. 7,240,958 to Skopic, U.S. Pat. No. 7,243,980 to Vala, U.S. Pat. No. 7,585,015 to Wood, U.S. Pat. No. 7,641,262 to Nusbaum, U.S. Pat. No. 8,079,634 to Visser et al., the U.S. Publ. No. 2003/005913 by Leonard, and references in those patents. The rear fairings, deflectors, boat tails, vanes and scoops streamline airflow around rear bluff edges of motor vehicles and/or re-direct part of airflow around a trailer into a flow path close to the trailer's rear vertical surface which results in the decreased size of a low pressure zone behind the vehicle and/or the lower pressure drop and thus reduces the air drag.

Rear spoilers are also used for streamlining airflow around the rear bluff edges of motor vehicles; e.g., U.S. Pat. No. 4,863,213 to Deaver et al. and references therein.

Another approach to reducing air drag in the back of motor vehicles is direct pumping of air into the trailer back; e.g., U.S. Pat. No. 6,561,575 to Fairburn et al., U.S. Pat. No. 6,685,256 to Shermer, U.S. Pat. No. 7,216,923 to Wong et al., and references in those patents. The air is taken from airflow around a vehicle or from a vehicle engine and delivered to the trailer back through air ducts.

Air deflectors on the trailer side walls were proposed for mitigating some of the detrimental effects of side winds; e.g., U.S. Pat. No. 6,224,141 to Brodlo, and references therein. The side deflectors of that patent streamline airflow around bluff edges on the sides of a trailer roof and prevent the trailer from overturning by strong side wind gusts.

All the above listed devices have several significant drawbacks that hinder their practical implementation. The devices are large in size, heavyweight, inconvenient in use and may interfere with operating cargo vehicles like loading and unloading. The most significant drawback of those devices is their inefficiency at side winds. Numerous scientific studies have shown that neither nose cones, split plates nor front and rear fairings and deflectors reduce noticeably air drag of cargo vehicles at side winds.

Another type of drag-reducing devices are small-scale vortex generators (SSVG) also referred to as small-scale turbulence generators, small eddy generators or generators of small-scale turbulence. For more than 80 years SSVG have been successfully used for a diversity of practical applications ranging from controlling a boundary layer on airfoils to reducing air drag of cargo vehicles.

The most well-known application of SSVG is that for aircraft wings, see, for example, U.S. Pat. No. 4,655,419 to van der Hoeven, U.S. Pat. No. 5,058,837 to Wheeler, U.S. Pat. No. 6,427,948 to Campbell, U.S. Pat. No. 6,491,260 to Borchers et al., and references in those patents. SSVG are widely used for delaying flow separation on airfoils and the aerodynamic stalling at high angles of attack and hence increasing the lift force and reducing intensity of harmful large-scale wingtip vortices.

Developed for airfoils, SSVG with minor or no modifications have been applied for reducing air drag on motor vehicles, e.g., U.S. Pat. No. 6,959,958 to Basford, U.S. Pat. No. 6,979,049 to Ortega et al., U.S. Pat. No. 7,255,387 to Wood, U.S. Pat. No. 7,431,381 to Wood, U.S. Pat. No. D432,073 to Coyle, and references in those patents.

Another broad application of SSVG is for intensifying turbulent mixing in heat exchangers, combustion chambers, automotive engines, paper machines and the like. Typical examples can be found in U.S. Pat. No. 4,359,997 to Lyssy, U.S. Pat. No. 4,836,151 to Litjens et al., U.S. Pat. No. 4,962,642 to Kim, U.S. Pat. No. 5,803,602 to Eroglu et al., U.S. Pat. No. 6,099,692 to Weisshuhn et al., U.S. Pat. No. 6,158,412 to Kim, U.S. Pat. No. 6,349,761 to Liu et al., and references in those patents.

Some of SSVG for intensifying turbulent mixing have also been adapted to drag reduction of motor vehicles. For example, widely used in combustion chambers porous plates were proposed as auxiliary walls around a whole trailer or its parts, e.g., U.S. Pat. No. 6,286,892 to Bauer et al. and references therein. Controllable air modulators are a representative example of more sophisticated implementation of small-scale vortices for reducing the trailer side and back air drag, for example the Patent application publication No. US 2009/0146452 by Kjellgren et al. and references therein.

SSVG have also been used for reducing air drag of mobile bodies, e.g., U.S. Pat. No. 7,934,686 to Harman, and references therein.

Prior art SSVG for motor vehicles share a significant drawback that was established in numerous scientific studies, namely, low efficiency in reducing air drag. The low efficiency results from considerable differences in operational requirements for vehicles from those for airfoils, combustion chambers, automotive engines and other conventional applications of SSVG. The basic requirement for all conventional applications is the lowest own aerodynamic resistance of SSVG. Airfoils are low-drag aerodynamic bodies operating at the flight speed of hundreds kilometers per hour and air ducts in combustion chambers, automotive engines and the like are designed as aerodynamically efficient transporters to ensure the highest airflow rate through the ducts. At the same time, only small lifespan and low intensity of generated vortices are required by conventional applications. For example, SSVG on air wings are typically required the vortices with a lifespan of less than half of the wing chord. In practice that value typically does not exceed half a meter and is comparable to the size of applied SSVG. The required lifespan of small-scale vortices in combustion chambers, automotive engines, heat exchangers and the like is typically of the order of few centimeters. To satisfy these requirements, all existing SSVG are open-type devices. In taking the path of least resistance, free airflow tries to keep itself away from the resistant obstacles and thus runs mainly outside the vortex-producing elements. Such self-adaptation of airflow ensures the lowest aerodynamic resistance of the open-type SSVG in accordance with the major requirement for conventional applications although leads to the low intensity and lifespan of generated small-scale vortices.

Motor vehicles impose completely different requirements on SSVG and the basic ones are the highest possible intensity and lifespan. Typical size of drag-producing volumes of cargo vehicles at the highway speed is from 3 m to 10 m with a typical size of harmful large-scale vortices in the same range. To effectively reduce air drag, SSVG for motor vehicles must generate highly intensive small-scale vortices with a lifespan comparable to the size of a drag-producing volume. At the same time, own aerodynamic resistance of SSVG is of low significance for motor vehicles due to a low driving speed of typically below 130 km/h and a very high air drag in the drag-producing volumes on bluff edges of large tractors and trailers.

As noted above, all existing SSVG for motor vehicles are either directly reproduced or slightly modified SSVG for airfoils, automotive engines and other conventional applications. Being the open-type devices with low aerodynamic resistance, they are physically inappropriate for producing intensive small-scale vortices with sufficiently large lifespan. Existing SSVG for motor vehicles generate low-intensity small-scale vortices with a short lifespan which results in a low reduction in the size of a flow separation zone, slight weakening of harmful large-scale vortices and thus low reduction in air drag of motor vehicles.

In addition, the majority of existing devices for reducing aerodynamic drag and mitigating detrimental effects of side winds are mounted permanently on external surfaces of motor vehicles.

Therefore, existing devices for reducing aerodynamic drag for vehicles at a cruise speed have the following significant shortcomings that hinder their practical implementation:
   The devices are unable to reduce aerodynamic drag of vehicles to any significant degree, and
   the majority of the devices are designed for airflow along the travel direction and they have a low efficiency in reducing detrimental effects of side winds.

Additional shortcomings of existing devices for reducing an air drag and mitigating detrimental effects of side winds for long distance cargo vehicles at typical highway speeds are as follows.
   The devices may interfere with loading and unloading cargo vehicles including opening and closing the trailer doors and backing into loading docks.
   The devices may extend significantly from the trailer surfaces and be easily damaged when a vehicle maneuvers on uneven roadsides and/or is backed into loading docks.
   The devices are technologically complicated, inconvenient to use and non-durable.
   The devices that are permanently mounted on a trailer do not address an issue of separate ownership, for example, a tractor may belong to an independent owners-operator and towed trailers may belong to a fleet-owning company.
   Existing mounting systems for attaching/detaching items such as tarp, temporary signs and the like to external vehicle surfaces do not allow attaching/detaching the items to trailer roof and sides by one person.

A need therefore exists for developing an innovative system that overcomes those shortcomings.

BRIEF SUMMARY OF THE INVENTION

It is accordingly an object of the invention to provide a device, an assembly, and a system that overcome the above-mentioned disadvantages of the heretofore-known devices and methods of this general type and which provide for the further improved alleviation of fluid-induced drag, such as aerodynamic drag and drag induced when a body moves through a liquid (pressure drag or wave drag, viscous drag).

Accordingly, an object of the present invention is to provide a plurality of devices that can be attached to a vehicle or/and installed by the vehicle manufacturer in the appropriate locations and being able to reduce significantly aerodynamic drag of a vehicle.

Another object of the present invention is to provide a plurality of devices that can be attached to a vehicle or/and installed by a vehicle manufacturer in appropriate locations and being able to mitigate effectively detrimental effects of side winds.

Yet another object of the present invention is to provide a plurality of devices that will not interfere with operating a vehicle such as loading and unloading a cargo vehicle, opening and closing trailer doors, backing into loading docks and the like.

An additional object of the present invention is to provide a plurality of devices that do not extend significantly from vehicle surfaces and thus will not be damaged when a vehicle maneuvers on uneven roadsides, backs into loading docks, and the like.

A further object of the present invention is to provide a plurality of devices that are technologically simple, convenient to use and durable.

It is the next object of the present invention to provide a plurality of devices that can be installed on and be effective for any types of vehicles moving through air or water such as heavy cargo trucks, cargo containers, liquid cargo cisterns, buses, RV's, SUV's, vans, passenger cars, railroad cars, helicopters, airplanes, aerostats, ships, submarines and the like.

It is another object of the present invention to provide a means for easy attaching to and removing from a vehicle any devices by a single person.

With the foregoing and other objects in view there is provided, in accordance with the invention, a vortex flow generating device, comprising:
   a vortex-generating element disposed to face into a fluid flow, the fluid flowing in a longitudinal direction and at a given velocity relative to the vortex-generating element;
   the vortex-generating element having at least one wall generally extending in the longitudinal direction and shaped to impose on the longitudinally flowing fluid a vorticity component; and
   a boundary wall disposed to form a vortex flow channel together with the at least one wall of the vortex-generating element and to limit a lateral flow of the fluid away from the at least one wall.

In accordance with an additional feature of the invention, the vortex flow channel has a forward opening facing into the fluid flow and a rear opening, wherein the fluid enters the forward opening having an energy substantially defined by a mass and a speed of the fluid along the longitudinal direction, and the fluid exits the rear opening in a spiral-shaped vortex flow having an energy substantially defined by the mass, the speed in the longitudinal direction, and a rotational velocity of the spiral-shaped vortex flow exiting the rear opening.

In accordance with an additional feature of the invention, the boundary wall is one of at least two or more walls together with the vortex-generating element defining at least two or more flow channels each having a wall with a shape for generating a vortex flow, and wherein individual fluid flows through the at least two or more flow channels combine downstream of the flow channels into a vortex flow having a spiral-shaped vortex flow.

In accordance with an additional feature of the invention, there is provided a housing enclosing the vortex-generating element, the boundary wall forming a part of the housing, and the housing having a funnel-shaped inlet facing into the fluid flow. In a preferred embodiment, the housing includes a downstream flow guide distally from the funnel-shaped inlet and disposed to divert a direction of a fluid flow through the vortex flow channel in a direction transversely to the longitudinal direction. In this case, a flow in the direction of travel (i.e., horizontal) is converted and directed downward behind the bluff edge and directly into the low-pressure zone behind the bluff edge.

With the above and other objects in view there is also provided, in accordance with the invention, an assembly for reducing aerodynamic drag on a vehicle that is subject to the aerodynamic drag while moving relative to a fluid, the vehicle having at least one bluff edge downstream of which, in a direction of movement of the vehicle, a drag-producing volume of a relatively lower fluid pressure is formed as compared to remaining zones surrounding the vehicle, the assembly comprising:

at least one or more vortex flow generating devices as outlined above strategically disposed to generate a vortex flow and to inject the vortex flow into the drag-producing volume and to thereby reduce an extent of the drag-producing volume and to reduce an aerodynamic drag on the vehicle.

In accordance with an additional feature of the invention, there are provided a multiplicity of such small scale vortex generators (SSVG) strategically disposed along bluff edges of the vehicle.

Where the vehicle is formed with bluff edges extending transversely to the direction of movement of the vehicle and with bluff edges extending along the direction of movement, the invention may preferably be embodied as follows:

the small scale vortex generators that are disposed along a respective transverse bluff edge are aligned with their flow channels extending in a direction of a plane defined by the direction of movement and a vertical (i.e., in the longitudinal direction plane); and the small scale vortex generators that are disposed along a bluff edge extending in the direction of movement of the vehicle, are oriented obliquely outward from the vehicle in a direction enclosing an acute angle relative to the direction of movement. Preferably, the acute angle between the small scale vortex generators and the longitudinal bluff edges lies in a range from 5 to 30°.

With the above and other objects in view there is also provided, in accordance with the invention, a device for reducing aerodynamic drag on a vehicle that is subject to the aerodynamic drag while moving relative to a fluid, the device comprising:

a fairing having a primarily smooth surface extending substantially in a direction of fluid flow while the vehicle is moving relative to the fluid, the primarily smooth surface being configured to redirect a substantially longitudinal flow towards a low pressure zone formed downstream of said fairing when the vehicle moves relative to the fluid;

a disturbance generating device disposed on, or formed in, the primarily smooth surface of the fairing, the disturbance generating device being configured to convert at least a portion of the substantially longitudinal flow into eddy currents or vortex flows and to inject the eddy currents or vortex flows into a low pressure zone formed downstream of the fairing when the vehicle moves relative to the fluid.

In accordance with a further feature of the invention, the disturbance generating device includes a plurality of vortex flow generators mounted on a surface of the fairing.

With the above and other objects in view there is also provided, in accordance with the invention, a system for reducing aerodynamic drag acting on a vehicle moving relative to a fluid, the system comprising:

a multiplicity of vortex flow generating devices as outlined above; and attachment means carrying pluralities of the vortex flow generating devices and being configured for attaching the vortex flow generating devices in vicinity of bluff edges of the vehicle and for injecting vortex flows into low pressure zones downstream of the bluff edges of the vehicle in a travel direction of the vehicle.

In accordance with a further feature of the invention, the attachment means are configured to attach the small scale vortex generators along the transverse bluff edge in alignment with the travel direction of the vehicle.

In accordance with another feature of the invention, the attachment means is formed by an assembly enabling a removable attachment thereof to the vehicle and comprising a housing bearing the small scale vortex generators and, optionally, other devices, and a tie-down component for enabling manual attachment of the system to the vehicle and manual removal of the system from the vehicle.

In accordance with a concomitant feature of the invention, the attachment means includes flexible components and rigid components for adapting to a shape and dimensions of the vehicle and for enabling the system to be mounted to the vehicle in a variable configuration.

In other words, the various above-noted objects of the present invention are achieved by providing a conceptually new system specifically developed for reducing aerodynamic drag and mitigating detrimental side wind effects for vehicles moving through air or water. The system generates intensive vortices and/or a sheet of vortices and directs those vortices into targeted drag-producing volumes around a vehicle. It is well-known that strong shear in the air speed near bluff edges leads to flow separation on the edges and generates harmful large-scale turbulent vortices on the boundaries of a separation zone. The large-scale vortices greatly increase the effective size of a separation zone and the pressure drop inside the zone and prevent the surrounding air from going into the zone. Those effects make the large-scale vortices the major physical contributors into air drag. Existing drag-reducing devices slightly weaken large-scale vortices but do not destroy them. Devices and a system of the present invention fully destroy harmful large-scale turbulent vortices or weaken them significantly. Physically small-scale vortices are small-scale disturbances in airflow and are merely carried by the airflow into its direction at head, tail or side winds and at no winds. In addition, small-scale vortices follow the path of the minimum resistance: go into the flow separation zone with the lowest pressure. These two features make small-scale vortices inherently self-adaptive by their very nature: the vortices adapt their trajectories to any changes in airflow around a vehicle such as changes in a driving speed, wind speed, wind direction, and the like.

To efficiently reduce air drag and mitigate detrimental side wind effects, the generated vortices should satisfy the following operational requirements specific for vehicles:

i. The intensity of the vortices should be very high, ii. a characteristic scale of the vortices should be in the order of magnitude, from about 10 to about 50 times smaller than a characteristic transverse size of targeted drag-producing volumes, and iii. a lifespan of the vortices should be of the order of magnitude of a characteristic longitudinal size of targeted drag-producing volumes.

The requirements specify the terms "small-scale vortex" and "large lifespan" that are used throughout the present application. It is well-known that a longitudinal vortex is characterized by two major dimensions: a diameter referred to as the vortex scale and a length referred to as the vortex lifespan. According to the requirement (ii), a vortex is called a small-scale vortex in the present application when its diameter is an order of magnitude smaller than a characteristic transverse size of a targeted drag-producing volume. According to requirement (iii), a vortex lifespan is called large when the vortex length is of the same order of magnitude as a characteristic longitudinal size of a targeted drag-producing volume.

The present invention provides new methods and a plurality of devices utilizing the methods that ensure generation of intensive small-scale vortices with large lifespan and/or a sheet of small-scale-vortices satisfying the above requirements. Those vortices are directed towards the targeted drag-producing volumes to streamline airflow around a vehicle, pump air into flow separation zones, reduce the zone size and pressure drop and/or pressure jump on the vehicle's surfaces, reduce shear on the boundaries of a flow separation zone and eliminate harmful large-scale turbulent vortices. These effects result in a greatly reduced air drag of a vehicle. The small-scale vortices are self-adaptive and work efficiently at any winds which lead to significant mitigation of detrimental effects of side winds. The vortices create a protective vortex shield around a vehicle that significantly increases stability and handling performance of motor vehicles, and improves a visibility to the vehicle operator by preventing particles like mud, rain and snow from spraying to the mirror height. The vortex shield also significantly increases visibility to operators of passing vehicles and decreases an "air impact" on the vehicles thus providing more safety and comfort for other drivers.

The present invention provides for the following inherently interrelated, and conceptually related parts:
  Conceptually new small-scale vortex generators (SSVG)
  Conceptually new fairing devices for reducing air drag for vehicles
  Novel system for reducing air drag and mitigating detrimental side wind effects for vehicles
  Sub-system for attaching to and detaching from motor vehicles the foregoing devices.

The first and second parts of the present invention provide exceptionally efficient new methods and devices for generating small-scale vortices of high intensity and large lifespan. This challenging goal is achieved by utilizing a new physical concept: develop devices that intensify and stabilize generated vortices by infusing significantly more mechanical energy into the vortices than that infused by existing devices.

This concept had never been applied for enhancing efficiency of SSVG or reducing air drag and mitigating detrimental effects of side winds for vehicles although its theoretical basis has been substantiated in a diverse body of theoretical and experimental scientific studies. When a fluid parcel of mass m moves longitudinally at a speed V, its kinetic energy is $$E_0 = \frac{mV^2}{2}.$$

When a vorticity is imposed on the parcel, its trajectory becomes a spiral and a rotational motion with a speed w is added to the parcel so its kinetic energy becomes $$E_w = \frac{mV^2}{2} + \frac{mw^2}{2}.$$

A vortex is a conglomerate of circular fluid parcels the rotational speed of which first increases with a distance from the vortex core and then drops to zero at the outer vortex diameter. The total vortex vorticity and energy (also referred to as the vortex intensity) are integrands over respectively the vorticity and energy of all fluid parcels in the vortex. The larger vortex intensity has to be produced by a vortex generator, the larger rotational speed w must be imposed on the fluid parcels and thus the larger kinetic energy $$\Delta E_w = E_w - E_0 = \frac{mw^2}{2}$$

must be infused by the generator into outgoing airflow.

According to the law of energy conservation, the energy cannot come from nowhere. There are two basic ways to add the energy to generated vortices. The first one is to develop SSVG containing own internally or externally powered energy-producing devices such as electrical turbofans and the like. Although that way is included in the present invention, the invention is mainly focused on more typical vortex generators that do not contain energy-producing devices, that is, passive devices. Such generators can utilize only one source of energy, the kinetic energy of a longitudinally moving surrounding airflow. The only physical mechanism for infusing mechanical energy into the generated vortices is to extract the longitudinal energy $$\Delta E_{\Delta V} = \frac{m\Delta V^2}{2}$$

from the surrounding airflow and transfer it into the rotational energy $$\Delta E_w = \frac{mw^2}{2}$$

or the vortices.

This concept is utilized in the first part of the present invention which provides for novel methods and devices for developing highly efficient SSVG. As explained above, the low efficiency of existing SSVGs results from their conceptual design: all existing SSVGs are open-type devices and self-adapting airflow runs mainly outside the vortex-producing elements following the path of minimum resistance and thus providing the lowest own aerodynamic resistance of the generator. The new method of the present invention is to prevent airflow from keeping away from the elements. It is achieved by confining airflow inside a channel in such a way that the airflow cannot bypass vortex-producing elements. When air is "trapped" ahead of the vortex-producing elements, it must traverse the channel with the vortex-producing elements which has the smaller cross-section area. According to the mass conservation law, the increase in air speed $\Delta V$ in the conceptually new SSVG is proportional to the shadowing of the cross-section area and to the curvature of the trajectory imposed by the elements. Cumulatively, those two impacts ensure efficient extraction of energy $$\Delta E_{\Delta V} = \frac{m\Delta V^2}{2}$$

from a longitudinal airflow which is transferred into the rotational energy of generated vortices $$\Delta E_w = \frac{mw^2}{2} \approx \Delta E_{\Delta V}$$

by the vortex-producing elements.

This is the primarily important aspect of the new physical concept of the present invention: develop devices that extract significantly more kinetic energy from surrounding airflow than existing devices and infuse this energy into the generated vortices. The concept appears counterintuitive in the following sense. When the novel SSVGs of the present invention extract an additional kinetic energy from surrounding airflow, it inevitably increases the aerodynamic resistance of the generators and that increased resistance is added to the total air drag of a vehicle. However, as it turns out, the added resistance is negligibly small compared with the vehicle air drag and, more importantly, to the reduction in the vehicle drag. The resulting outcome of conceptually new devices of the present invention is an exceptionally efficient reduction in the vehicle drag and fuel consumption. Another exceptional effect of the new devices is a significant reduction in the detrimental effects of side winds.

The present invention exploits two more well-known physical facts. The first one is that vortices with the longitudinal axes have a much greater lifespan than those with the transverse axes. Physical explanation of this fact is also well-known: longitudinal vortices have much lower velocity shear on their outer boundaries than the transverse ones and they thus dissipate much more slowly. Another physical fact is that the lifespan for a pair of longitudinal vortices with the opposite rotational direction is larger than that of a single vortex. Airplane wingtip vortices are a well-known example of such a pair. Those two facts are utilized in the present invention for increasing further the lifespan of generated vortices.

The present invention provides a diverse body of devices that utilize the new method. The proposed devices utilize a diversity of channel configurations and a diversity of types and configurations of vortex-producing elements. SSVG of the present invention comprise at least one air channel and at least one vortex-producing element. A channel comprises at least a roof above or ahead of the vortex-producing element(s) where the roof may be of any shape such as flat, angular, twisted and the like. A channel may have a floor and/or at least one side wall of any shape. The side walls and/or a roof of the proper shape like tilted, angular, twisted, and the like may serve as vortex-producing elements by themselves or in combination with other elements inside the channel. A roof may extend out of side walls and/or vortex-producing elements or be confined by the walls and/or the elements. A roof may be attached to side walls and/or vortex-producing elements or lifted above those. The channel centerline may be straight or curved in any way. To enhance the air rate through channels, channels may have an air inlet of an appropriate shape. An exhaust nozzle of an appropriate shape may be added to channels to enlarge further the lifespan of generated vortices. Each channel may have an internal cross-section of any shape such as circular, triangular, pentagonal and the like and the cross-section may be constant or vary along the channel centerline. A channel may be shaped similar to any existing channel-type device for drag reduction of motor vehicles like horizontal, arcuate and/or vertical vanes or scoops with vortex-producing elements of any configuration inside or behind the channel. Two or more channels may be used, for example for generating a plurality of adjacent vortices with the opposite rotational directions. SSVG may have a frame for enhancing its structural strength, improving external appearance, and/or mounting on the vehicle surface and/or in the below described new fairing devices.

Vortex-producing elements may be located inside a channel or channels and/or behind the channels. Vortex-producing elements may be of any type such as twisted blades, curved fins or ribs, bluff obstacles, and others. The most efficient are the elements producing vortices with the longitudinal axes such as twisted blades, curved fins or ribs and the like. Depending on the element configuration, there may be any number of elements inside each channel. In particular, at least one channel wall or/and roof of a proper shape may serve as vortex-producing elements. Positions of vortex-producing elements may be affixed or variable such as the elements may be rotated around any predetermined axes by varying airflow and the like. Vortex-producing elements may be moved or rotated by external power sources such as electrically driven turbine and the like.

In addition to intensifying generated small-scale vortices and increasing their lifespan, air channels of SSVG of the present invention may streamline airflow around bluff edges, pump directly an additional air into low pressure flow separation zones, protect the vortex-producing elements from mechanical damage, and also serve decorative purposes for improving an external appearance of the generators.

In addition to vehicles, conceptually new SSVG of the present invention may also be applied for intensifying turbulent transfer of mass, momentum and energy in chemical reactors, heat exchangers, paper machines and other devices especially large-size ones where high intensity and large lifespan of small-scale vortices are of utmost importance.

The second important element of the present invention is a conceptually new method and devices for more efficient reduction of air drag on vehicles affected by a novel type of fairing than drag reduction provided by existing fairings. As outlined above, existing fairings of aerodynamically smooth shape streamline airflow around bluff edges and thus reduce the size of a flow separation zone and the air drag at no side winds although the devices are inefficient at strong side winds. The new method is to greatly boost drag reduction by adding one more physical impact to a pure streamlining: intensified turbulent transfer of mass and momentum behind the fairing. In other words, the new method of the present invention is to couple in a single apparatus two favorable physical effects: streamlining airflow and intensifying the turbulent transfer. The combined outcome of those coupled physical effects on reducing air drag of a vehicle is much larger than that of each one of the effects separately. This method is based on the same new physical concept as the first one, namely developing devices that extract kinetic energy from surrounding airflow and infuse this energy into generated vortices. It is achieved by developing new fairing devices of a bluff shape and/or with bluff obstructions and/or slots that generate intensive small-scale vortices. Those added vortices intensify turbulent transfer of mass and momentum behind the devices which results in enhanced reduction in the size of a flow separation zone, reduced sheer in the air speed on the zone boundaries and significant weakening of harmful large-scale vortices.

This new method for efficient reduction in air drag of vehicles by fairings seems counterintuitive in the same sense as the first one. When conceptually new fairing devices of a bluff shape and/or with bluff obstructions and/or slots extract the kinetic energy from surrounding airflow for generating small-scale vortices, it inevitably increases the aerodynamic resistance of the devices and that increased resistance is added to the total air drag of a vehicle. However, as with the first method, the added resistance is negligibly small compared to the vehicle air drag and, more importantly, to the reduction in the vehicle drag. The resulting outcome of conceptually new fairing devices of the present invention is a significant reduction in a vehicle drag and fuel consumption compared to existing low-resistance fairings of an aerodynamically smooth shape. Another favorable outcome of the new fairing devices is a reduction in the detrimental effects of side winds which existing devices are unable to provide.

The present invention provides a diverse body of conceptually new fairing devices utilizing the new method. These new devices streamline airflow around bluff vehicle edges as any conventional fairing and, in addition, generate small-scale vortices and direct the vortices into the drag-producing volumes for intensifying the turbulent transfer of mass and momentum.

The new fairing devices may comprise any type of an existing fairing including aerodynamic trailer skirts for streamlining airflow and a predetermined sub-set of SSVG attached to the lower or/and upper surface of the fairing for generating small-scale vortices.

The fairing devices of the present invention may also generate a vortex sheet by themselves. It is achieved by developing new vortex-generating fairings of a bluff shape and/or with bluff obstructions on the upper and/or lower surfaces, and/or with properly shaped slots. The new fairing may have a head and/or tail of aerodynamically smooth or bluff shape. Bluff obstructions of any type like bumps, fins, serrated plates, etc. may be located on the upper and/or lower surfaces of a fairing. Any number of slots of appropriate configuration for producing small-scale vortices may be positioned in a fairing body. The fairing's lower surface may be tilted towards or away from the vehicle's surface or being parallel to the surface. Intensity and lifespan of vortices generated by such new fairing may be further increased by attaching a predetermined sub-set of SSVG to its lower or/and upper surface.

SSVG attached to fairing devices of the present invention may be of any configuration including conceptually new SSVG of the present invention, existing SSVG developed for any applications, or newly developed generators.

The new fairing devices of the present invention may also comprise an existing aerodynamically smooth fairing or the new vortex-generating fairing as the upper component and the lower component with a predetermined sub-set of SSVG of any configuration attached between the components where the lower component may also be an existing fairing or new fairing of the present invention. If the lower component is used, its upper surface may be angled with respect to the vehicle's surface or parallel to the surface and its tail may be of smooth or bluff shape.

The new fairing devices of the present invention may have wingtips for further enhancing their performance and protecting a device from mechanical damage. The wingtips may be solid or have holes of any shape for enhancing further the performance of fairing devices. The wingtips may be angled with respect to the driving direction. The fairing devices may be mounted on a vehicle surface or separated from the surface.

Conceptually new SSVG and fairing devices of the present invention may be manufactured from plastic, metal, or other materials. The lightweight materials are preferred; however the material should ensure sufficient structural strength and durability to withstand harsh operational conditions like abrupt variations in temperature, humidity, extensive exposure to ultraviolet radiation and the like. To satisfy those conditions, air channels and vortex-producing elements of the same SSVG may be manufactured from different materials. The fairings may be manufactured from the materials different from those for SSVG.

The third part of the present invention is a new system for significant reduction in air drag and mitigation of detrimental side wind effects for vehicles moving through air or water. The system comprises a plurality of assemblies mounted on a vehicle in appropriate locations. Each of the assemblies comprises a predetermined sub-set of conceptually new SSVG of the present invention and/or a conceptually new fairing device of the present invention.

In the contents of the present invention, the appropriate locations are defined as any locations on a vehicle surface or near the surface where the assembly may reduce air drag in targeted drag-producing volumes. To achieve this goal, the assemblies may be installed in front of targeted drag-producing volumes or inside the volumes. Different assemblies comprising predetermined sub-sets of SSVG of the present invention or new fairing devices of the present invention may be mounted on the same vehicle in different locations. Any combination of the assemblies may be attached to a vehicle and/or be installed by a vehicle manufacturer as parts of a vehicle body in some locations or throughout the vehicle.

The assemblies may be mounted on a vehicle surface or separated from the surface. If an assembly contains a sub-set of SSVG, separations between individual SSVG in the assembly may be fixed or variable and the SSVG may be mounted at fixed or variable angles with respect to the driving direction as well as to each other.

An assembly may have a means for protecting a vehicle surface such as an underneath layer of rubber, plastic and the like. An assembly may include a supporting holder for being mounted outside a vehicle surface such as underneath a trailer, in front of a tractor radiator and the like. If the assemblies are to be attached to a vehicle, any standard or newly developed attachment means can be used including but not limited by rivets, screws, glue, adhesive tape and the like.

The system of the present invention streamlines airflow around a vehicle, generates intensive small-scale vortices with a large lifespan and/or a sheet of intensive small-scale vortices and directs those vortices into the vehicle drag-producing volumes. The system pumps additional air in flow separation zones, reduces the zone size and a pressure drop and/or jump on vehicle surfaces, reduces shear in air speed on the boundaries of flow separation zones and eliminates harmful large-scale turbulent vortices. Those valuable impacts result in the exceptionally efficient reduction in the vehicle air drag. A self-adaptive nature of small-scale vortices leads to significant mitigation of detrimental effects of side winds.

The fourth part of the present invention is a sub-system for fast and easy attaching to and detaching from a vehicle SSVG of the present invention. The sub-system may also be used for attaching to and detaching from a vehicle lights, cameras, any kind of sensors or other small devices. The sub-system comprises a housing for carrying SSVGs or/and other devices and a tie-down component for attaching the housing to and removing it from a vehicle. The housing comprises at least the lower component with SSVG attached to its upper surface. The housing may also have the lower and the upper components with SSVG attached between the components. The components may be flexible constructions of adjustable length such as belts, caterpillar tracks, chains and the like, rigid constructions of adjustable length including new fairing devices of the present invention, or a combination of separated flexible and rigid segments. The segments may have flexible and/or rigid center and corner connectors allowing the rigid segments to be folded for storage and transportation.

The housing may include variable means for increasing structural strength like throughout wires and/or a means for protection from moving in the forward/backward directions like safety straps. The housing may further include variable means for protecting vehicle's surface like springs, rubber or plastic underneath layers and the like. The housing may carry only one type of devices such as SSVG or/and any combination of different devices. The number, positions and type of SSVG and/or other devices may be preset or flexible. The devices may be mounted on a housing permanently or attachable and lockable in predetermined positions. The subsystem may be combined with a plug-in wiring harness should any electrical power for the devices be necessary. Devices may be attached to the housing by any standard or newly developed means like pins, screws, glue and the like. The sub-system may also include auxiliary aiding tools for placing the devices on and removing from a trailer roof and sides.

The sub-system may be adapted to any shape of a vehicle that it is mounted on, imposes no extensive changes to a size or a shape of the vehicle, and provides stable structure for the devices when mounted. The sub-system allows attaching/detaching SSVG and/or other devices on both sidewalls and the roof of a tractor and/or trailer simultaneously, or may be used for a partial load, for example only for the roof and one sidewall. It also allows mounting the devices around any rounded body of a cistern and alike. The sub-system may be universal for any type and/or model of a vehicle with adjustable length and/or shape of one or several components or specific for each model or type of a vehicle and predetermined combination of devices.

The primarily advantageous features of the present invention distinguishing it from the prior art may be summarized as follows.

The invention provides two conceptually new methods for generating small-scale vortices of very high intensity and large lifespan and/or a sheet of small-scale vortices. The methods utilize a new physical concept: intensification and stabilization of generated vortices by infusing into the vortices the extra mechanical energy from airflow around a vehicle.

The invention provides a plurality of devices utilizing the new methods for generating small-scale vortices of very high intensity and large lifespan and/or a sheet of small-scale vortices.

Conceptually new SSVG comprising at least one air channel to prevent airflow from bypassing vortex-producing elements and at least one element inside the channel that produces intensive small-scale vortices with large lifespan in the airflow.

Conceptually new fairing device that streamlines airflow as a conventional fairing and, in addition generates small-scale vortices in the airflow by coupling a fairing of any configuration with SSVG of any configuration.

Conceptually new fairing of a bluff shape and/or with bluff obstructions on its upper and/or lower surfaces and/or slots that streamlines airflow as a conventional fairing and generates a sheet of small-scale vortices, either by itself or in combination with SSVG of any configuration.

The invention provides a plurality of assemblies that comprise any of the devices of the present invention or any combination of these devices.

The invention provides a system comprising a plurality of the assemblies that are attached to a vehicle or/and installed by a vehicle manufacturer in appropriate locations with respect to targeted drag-producing volumes.

The developed system is significantly more efficient in reducing an aerodynamic drag of a vehicle and mitigating detrimental effects of side winds that any existing system, device or combination of existing devices.

The system significantly increases stability and handling performance of motor vehicles, improves a visibility to the vehicle operator and operators of passing vehicles, and decreases an "air impact" on the passing vehicles.

The system does not interfere with operating a vehicle such as loading and unloading a cargo vehicle, opening and closing trailer doors, backing into loading docks and the like.

The system does not extend significantly from vehicle surfaces and thus will not be damaged when a vehicle maneuvers on uneven roadsides, backs into loading docks, and the like.

The system and its components are technologically simple for manufacturing, convenient to use and highly durable.

The system can be installed on and be effective for any types of vehicles moving through air or water such as heavy cargo trucks, cargo containers, liquid cargo cisterns, buses, RV's, SUV's, vans, passenger cars, railroad cars, helicopters, airplanes, aerostats, ships and submarines and the like.

With the above and other object in view there is also provided, in accordance with the invention, a sub-system that allows easy attachment to and removal from a vehicle any of the above-described devices, advantageously by a single person.

Other features which are considered as characteristic for the invention are set forth in the appended claims.

Although the invention is illustrated and described herein as embodied in a method, device, and system as outlined it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE SEVERAL VIEWS OF THE DRAWING

FIGS. 4A and 4B are respectively a prospective view and a cross-section of two other configurations for SSVG.

FIGS. 5A-5C illustrate preferred embodiments with dimensions of SSVG of the present invention.

FIGS. 7A-7C are sections through exemplary fairing devices according to the invention.

FIGS. 9A-9D are perspective views of SSVG assembly systems strategically mounted to an exemplary vehicle.

FIGS. 14A-14C show selected elements of the sub-system.

DESCRIPTION OF A PREFERRED EMBODIMENT OF THE INVENTION

Figure 1:
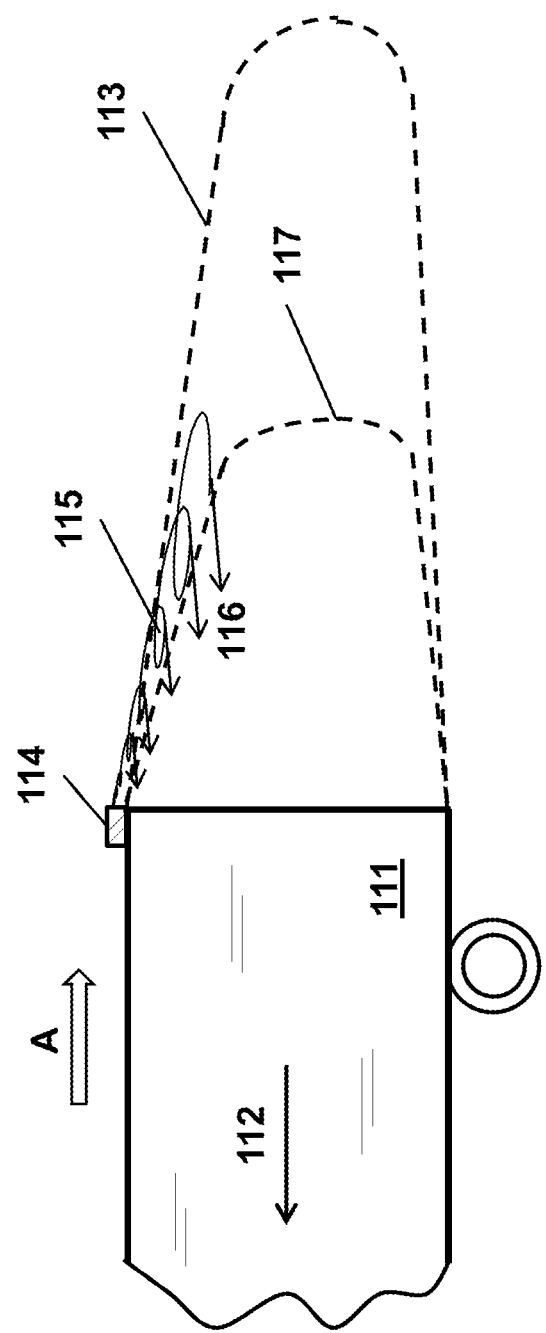
FIG. 1 is a schematic side view of a moving object illustrating the physical basis of the present invention.

Referring now to the figures of the drawing in detail, there are seen various illustrations of basic conceptual embodiments of the invention. While specific implementations are described, it should be understood that this is done for illustration purposes only. The described small-scale vortex generators (SSVG) and their components may be modified and a plurality of other elements for efficient generation of small-scale vortices may be incorporated into the generators individually or in any combination. The described new fairing devices, sub-systems for reducing air drag and mitigating detrimental effects of side wind, sub-system for attaching/detaching devices to motor vehicles and their components may be modified and a plurality of other means for performing the designated functions may be incorporated into the devices and sub-system individually or in any combination. Those and other modifications may be incorporated into the SSVG, fairing devices and the sub-systems without departing from the spirit and scope of the present invention.

Reference is had, in this context, to our U.S. Design Pat. No. D667,373, issued to us on Sep. 18, 2012, which shows certain design elements of an exemplary embodiment of the invention. The earlier design application is herewith incorporated by reference.

FIG. 1 illustrates the physical basis of the present invention. It shows the rear end of a typical cargo trailer 111 moving in the direction of an arrow 112. An arrow A indicates the direction of a surrounding airflow with respect to the trailer. The airflow cannot make a sharp turn and fill a space behind the trailer thus creating a flow separation zone 113 of a low pressure and a pressure drop on the trailer back. Separation zone 113 is the rear drag-producing volume of a large size and respectively of a high air drag. SSVG of the present invention 114 produce intensive small-scale vortices with large lifespan 115. These vortices increase turbulence intensity at small scales and intensify turbulent transfer of mass and momentum. It leads to significantly reduced shear in the air speed which in turn delays flow separation and prevents the very origination of harmful large-scale turbulent vortices. The generated small-scale vortices 115 pump additional air into the flow separation zone as illustrated by arrows 116. It results in a greatly reduced zone size from the large one as 113 to the much smaller one as 117, the diminished pressure drop on the rear trailer surface and thus in the exceptionally efficient reduction in the vehicle air drag. A self-adaptive nature of small-scale vortices 115 leads to significant mitigation of detrimental impact of side winds.

Figure 2A:
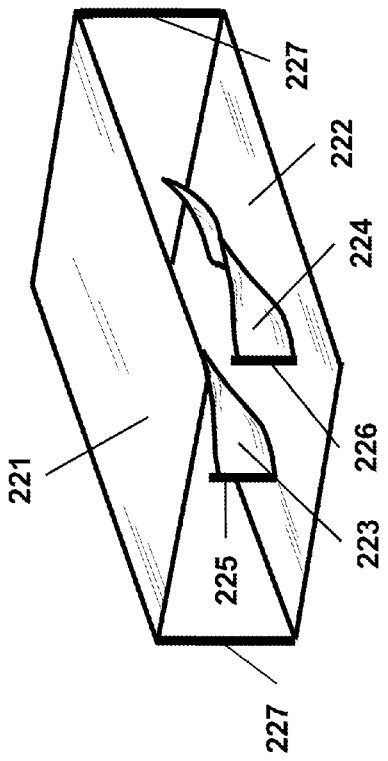
FIGS. 2A-2D are perspective views showing four configurations for small scale vortex generators (SSVG) according to the invention.

The first part of the present invention is conceptually new small-scale vortex generators for generating small-scale vortices with exceptionally high intensity and large lifespan. The preferred embodiments of the generators are described with reference to the drawings in FIGS. 2-5. SSVG of the present invention comprise at least one air channel and at least one vortex-producing element. A channel comprises at least a roof above or ahead of the vortex-producing element(s) where the roof may be of any shape such as flat, angular, twisted and the like. The simplest SSVG of the present invention positioned on an external surface of a vehicle is shown in FIG. 2A. This figure shows a small segment of the rear end of a vehicle surface 210 and an arrow B indicates the driving direction. SSVG in FIG. 2A comprises a V-shaped vortex-producing element 212 attached near the rear edge of a surface 210 and a flat roof 211 above the element which limits a lateral airflow away from an element 212. The roof is attached to a surface 210 by supports 213 and its rear edge is tilted towards the surface.

Figure 2B:
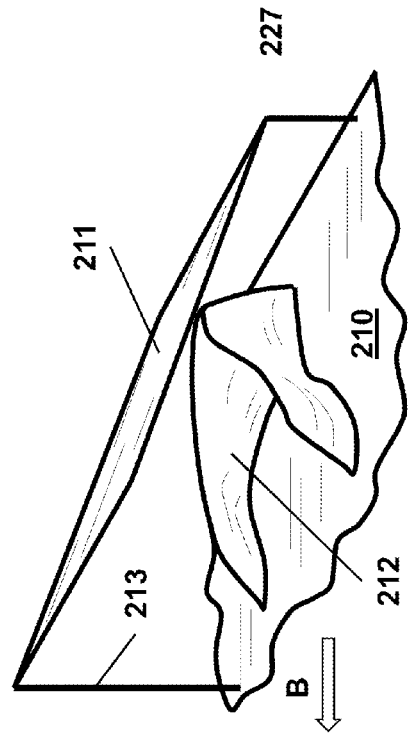

The channel may have a floor and/or at least one side wall. FIG. 2B illustrates SSVG comprising a flat roof 221, or boundary wall, connected to a flat floor 222 by supports 227 and vortex-producing elements 223 and 224. SSVG in FIG. 2C has a flat roof, or boundary wall, 231, a flat floor 232, one flat side wall 233, or boundary wall, and a vortex-producing element 234. SSVG with a roof, a floor and two side walls, each forming a boundary wall, are illustrated in FIGS. 2D, 3A and 3B. The floor and/or side walls may be of any shape such as flat, curved, angular, twisted, and the like. FIG. 2D illustrates SSVG with a flat roof 241, a flat floor 242, curved walls 243 and vortex-producing elements 244. SSVG with curved walls 313 and 314 is illustrated in FIG. 3A and it has a flat roof 311, a flat floor 312 and a vortex-producing element 315. The side walls and/or roof of the proper shape like curved, angular, twisted, and the like may serve as vortex-producing elements by themselves or in combination with vortex-producing elements inside the channel. This is illustrated in FIG. 3B where SSVG with a flat roof 321 and a flat floor 322 has twisted side walls 323 and 324 and the twisted walls produce the outgoing vortices. A channel roof may extend outside side walls and/or the elements as illustrated by extended roofs 211 in FIG. 2A and 221 in FIG. 2B. A roof may also be confined by the walls and/or the elements as illustrated by the roofs 241 in FIG. 2D, 311 in FIG. 3A and 321 in FIG. 3B. A roof may be attached to side walls and/or vortex-producing elements as 241, 311 and 321 in FIGS. 2D, 3A and 3B, or it may be lifted above those as 211 in FIG. 2A and 231 in FIG. 2C. The channel centerline may be straight as in FIGS. 2A-2D and 3B or curved in any way as illustrated in FIG. 3A by a channel with a curved centerline 316.

Figure 3A:
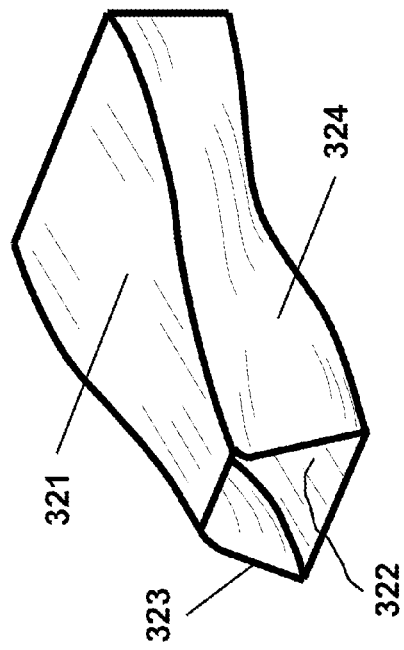
FIGS. 3A-3D are further views of three other configurations for SSVG.
Figure 3B:
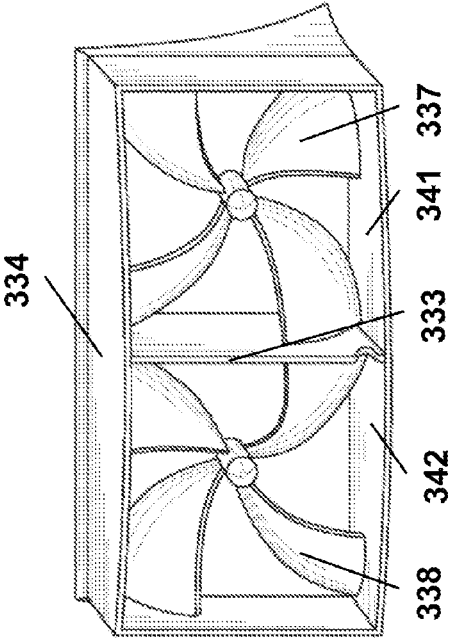
Figure 3C:
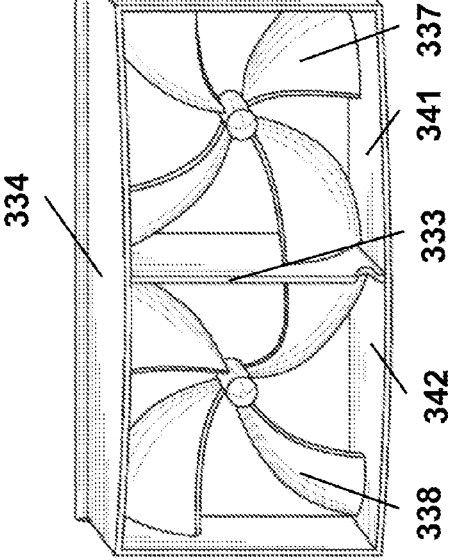
Figure 3D:
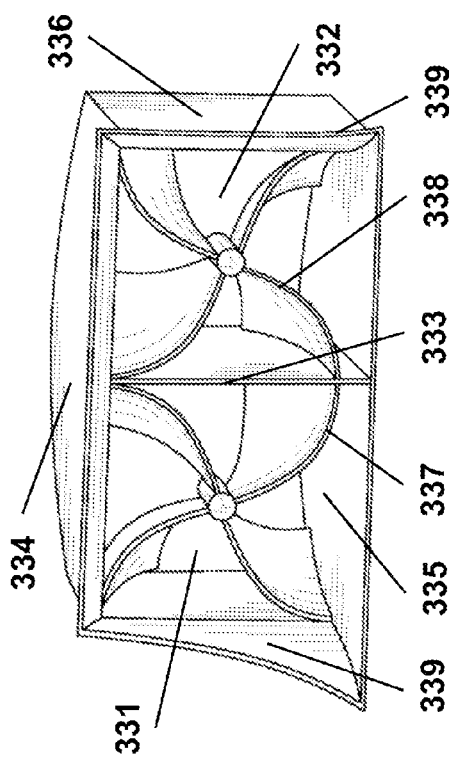

To enhance the air rate through channels, the channels may have an air inlet of an appropriate shape as illustrated in FIG. 3C. An exhaust nozzle of an appropriate shape may be added to channels to enlarge further the lifespan of generated vortices as illustrated in FIG. 3D. FIGS. 3C and 3D show the front and back prospective views of the most effective SSVG of the present invention. Design of that generator is the subject of the U.S. Design Pat. No. D667,373 incorporated into the present invention. SSVG in FIGS. 3C and 3D has two square-shaped air channels 331 and 332 separated by a wall 333. The channels share a roof 334 and a floor 335 and each channel has an outside wall as 336. Each one of the vortex-producing elements 337 and 338 inside the channels consists of four helically twisted blades with curved ends. The channels 331 and 332 have a common air inlet 339 and exhaust nozzles 341 and 342 which are separated by the wall 333. More details about this generator are given below with reference to FIG. 5.

Each channel of SSVG of the present invention may have an internal cross-section of any shape such as circular, triangular, pentagonal and the like. Channels with a rectangular cross-section are illustrated in FIGS. 2D and 3A, channels 331 and 332 with a square cross-section are shown in FIGS. 3C and 3D, and channels 411 and 412 with a hexagonal cross-section are shown in FIG. 4A. The channel cross-section may be constant along a channel centerline as in FIGS. 3A, 3C and 3D, or it may vary along the centerline as illustrated in FIG. 3B. A channel may be shaped similar to any existing pure channel-type device for drag reduction of motor vehicles, such as horizontal, arcuate and/or vertical vanes or scoops, although SSVGs with such a channel must contain vortex-producing elements of any type inside or behind the channel. Such an embodiment is described below with reference to FIGS. 4B and 9C. SSVG of the present invention may utilize two or more channels, for example for generating a plurality of adjacent vortices with the opposite rotational directions as illustrated in FIGS. 3C, 3D and 4A.

SSVG may have a frame for enhancing its structural strength, improving an external appearance, and/or mounting on a vehicle surface and/or in the below described new fairing devices. Such SSVG with a frame is illustrated in FIG. 4A and it has two channels 411 and 412 with the hexagonal cross-section. Each one of vortex-producing elements 413 and 414 inside the channels consists of six curved fins. The generator has a frame 415 with a flat bottom 416 for easier attaching to a vehicle surface.

Figure 2C:
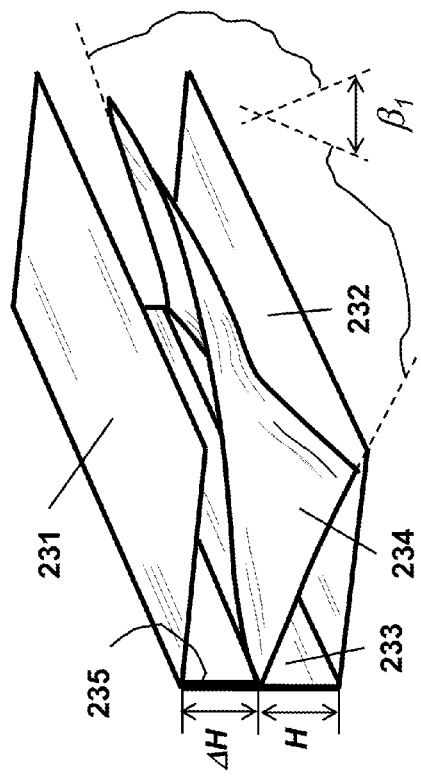
Figure 2D:
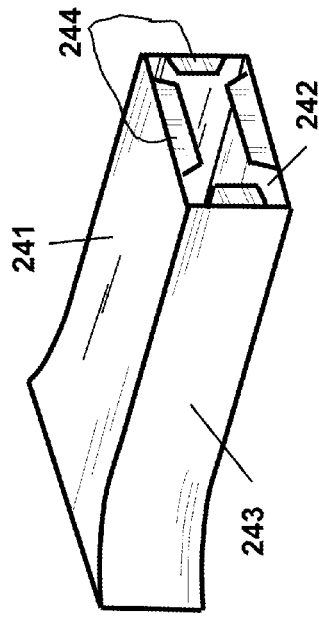

Vortex-producing elements may be located inside a channel or channels as 212 in FIG. 2A, 223 and 224 in FIG. 2B, 234 in FIG. 2C, 315 in FIGS. 3A and 337 and 338 in FIGS. 3C and 3D. The elements may also be located behind a channel as 244 in FIG. 2D. The elements may be of any type such as bluff obstacles, twisted blades, curved fins or ribs, and others. Two examples of "classic" bluff obstructions for producing small-scale vortices with transverse axes are the turbulent grid 315 in FIG. 3A and flat serrated plates 224 in FIG. 2D. The most efficient are the elements that produce intensive vortices with the longitudinal axes. Typical vortex-producing elements of this type include V-shaped curved blades as 212 in FIG. 2A, helically twisted blades as 234 in FIGS. 2C and 337 and 338 in FIGS. 3C and 3D, curved fins as 223 and 224 in FIG. 2B and the like. Helically twisted blades as in FIG. 2C are especially efficient and flexible vortex-producing elements. Such blades may be adjusted to a channel of any cross-section such as circular, rectangular, pentagonal and the like, and their performance may be controlled by varying rotation angle $\beta_1$ in FIG. 2C.

Depending on a type of vortex-producing element, there may be any number of elements inside each channel. One element 212 is shown in FIG. 2A, in FIG. 2C as 234 and in FIG. 3A as 315, two elements are shown in FIG. 2B as 223 and 224, four elements are illustrated in FIG. 2D as 244 and in FIGS. 3C and 3D as 337 and 338, and six elements are shown in FIG. 4A as 413 and 414. At least one channel wall or/and a roof of a proper shape may serve as vortex-producing elements as illustrated by twisted side walls 323 and 324 in FIG. 3B.

Positions of vortex-producing elements in SSVG of the present invention may be fixed as in FIGS. 2A, 2C, 2D, 3A-3D and 4A or variable in such a way as the elements may be moved by varying airflow, control devices and the like. An example of vortex-producing elements with a variable position is shown in FIG. 2B where curved fins 223 and 224 are attached to axes 225 and 226 and may be rotated around the axes by airflow when a yaw angle of surrounding airflow changes due to changing side winds, driving speed or other conditions.

Figure 9C:
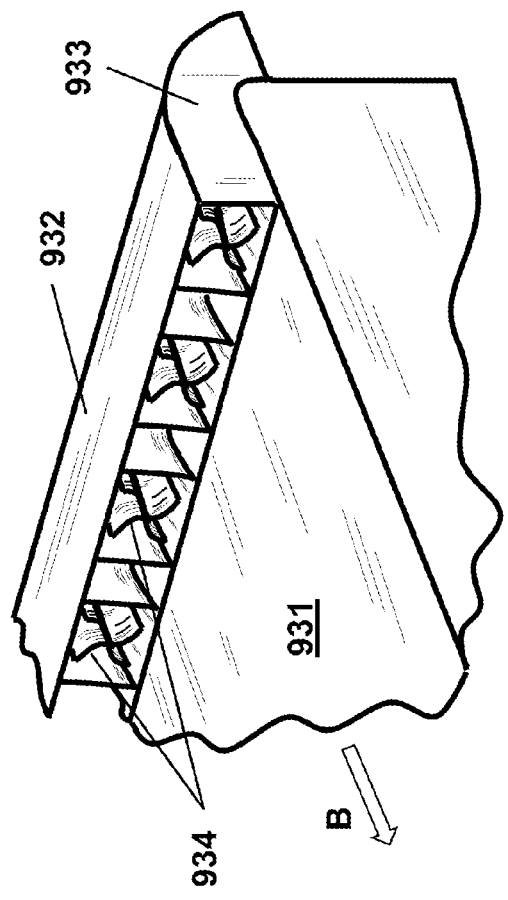

In addition to the energy extracted from surrounding airflow, vortex-producing elements in SSVG of the present invention may be powered by external energy sources to increase further intensity and lifespan of generated vortices. A cross-section of such powered SSVG is shown in FIG. 4B. The generator has a channel of a rectangular cross-section 421 with an air inlet 422 and an exhaust nozzle 423. A vortex-producing element is a turbine 424 attached to an electric motor 425 inside a channel where the motor may be attached to a channel by a support 426. A turbine 424 is rotated by a motor 425 which may be powered by vehicle's electric generator, batteries, solar cells and the like, for example through wiring 427. A prospective front view of such generator is illustrated in FIG. 9C.

Although the major function of air channels in SSVG of the present invention is efficient extracting of energy from surrounding airflow, the channels may accomplish other supplementary functions. For example, an air channel of the generator in FIGS. 4B and 9C is shaped as a typical arcuate vane. When mounted on the rear bluff edge of a vehicle, the channel's arcuate upper surface streamlines airflow around the edge and a nozzle 423 pumps an additional air directly into a low-pressure flow separation zone thus enhancing further the performance of SSVG. Air channels of SSVG of the present invention may also protect vortex-producing elements from mechanical damage. The channels may further serve as decorative elements for improving an external appearance of SSVG as illustrated in FIGS. 3C, 3D, 4A, 4B and 9C.

Dimensions of SSVG of the present invention shall satisfy the second and third operational requirements for vehicles formulated in the Summary of Invention, namely: (ii) a characteristic scale of the vortices should be an order of magnitude, from about 10 to about 50 times smaller than a characteristic transverse size of targeted drag-producing volumes, and (iii) a lifespan of the vortices should be of the order of magnitude of a characteristic longitudinal size of targeted drag-producing volumes. It is clear that specific dimensions of SSVG depend on a size of the targeted drag-producing volumes and those in turn depend on a vehicle type, location of SSVG on a vehicle and the like. For example, a preferred SSVG for a passenger car would be of much smaller size than that for a cruise ship.

For illustration purposes only, preferred dimensions of SSVG for typical heavy cargo trucks are discussed below with reference to FIG. 5. The dimensions are provided for SSVG similar to the most efficient SSVG of the present invention in FIGS. 3C and 3D. The dimensions for other types of SSVG may be chosen accordingly.

A top view of the considered SSVG with a removed roof in shown schematically in FIG. 5A; the arrows B in FIGS. 5A and 5C indicate the driving direction. The generator comprises two air channels 511 and 512 of a square cross-section separated by a straight wall 513. The channels in FIG. 5A have a common air inlet 514 and separated exhaust nozzles 515 and 516. The external side walls 517 and 518 are straight and extend into the nozzles. The vortex-producing elements inside the channels are shown schematically in FIG. 5A by double arrows 519 and 520. A front view of one channel without an inlet and nozzle is shown schematically in FIG. 5B.

Air channels 511 and 512 of the generator in FIG. 5 are characterized by the following major dimensions: the height H, the width W, and the length $L_{ch}$. Typical transverse size of the drag-producing volumes for heavy cargo trucks varies from one to three meters. To satisfy operational requirement (ii), the preferred scale of generated vortices may vary from about 2 cm to about 30 cm. Taking into account that the vortex scale increases with a distance from a generator and the generators should not extend significantly from vehicle surfaces, the preferred height H of SSVG of the present invention may vary from about 1 cm to about 7 cm and the preferred width W may vary from about 1 cm to about 15 cm. To satisfy operational requirement (iii), a channel length $L_{ch}$ may vary from about 2 cm to about 20 cm, preferably being about twice the channel width or height, whatever is larger.

The major dimensions of an air inlet 514 are its length $L_{in}$ and the entering angle $\beta_{in}$ and those of nozzles 515 and 516 are the center length $L_{nz}$ and the side length $L_A$. The length $L_{in}$ of an air inlet 514 shall be sufficient to "trap" reliably airflow ahead of vortex-producing elements 519 and 520. The preferable values of $L_{in}$ vary from about a quarter to one-half of the channel length $L_{ch}$ or from about 1 cm to 10 cm. The entering angle $\beta_{in}$ of an inlet 514 shall be sufficient for bringing as much air as possible in the channels at varying driving conditions and it may vary from zero to 60 degrees depending on the chosen operational values for a vehicle speed and a cross wind speed (the cross wind is defined as the wind directed perpendicular to the driving direction). The angle $\beta_{in}$ of approximately 17° in FIG. 5A covers a stable cross wind up to 30 km/h at the vehicle cruise speed of about 100 km/h. The center length $L_{nz}$ of nozzles 515 and 516 shall be sufficient for reliably stabilizing generated vortices to better satisfy requirement (ii). The preferred values of $L_{nz}$ vary from about one-third to one channel length $L_{ch}$ or from about 1 cm to 20 cm. On the contrary, the side nozzle length $L_A$ should allow the vortices to diverge for further enlarging the lifespan. The preferable values of $L_{in}$ are below a quarter of the center length $L_{nz}$ or from zero to about 5 cm.

The entering angle $\beta_{in}$=0 in FIG. 5A corresponds to straight side walls of an air inlet. At non-zero $\beta_{in}$, the walls may be curved as in FIG. 5A or at other curvatures to ensure the larger entrance area of the inlet than that of the channel cross-sections. A roof of an air inlet may be straight, or curved away from a floor as 334 in FIGS. 3C and 3D or towards a floor. Similarly, a roof of an exhaust nozzle may be straight as 334 in FIGS. 3C and 3D, or curved at any curvature towards a floor or away from a floor, for example as in FIGS. 4B and 9C.

Vortex-producing elements 519 and 520 in FIG. 5A consist of four helically twisted blades each. Cross-section C-C in FIG. 5B of one element inside a channel is shown schematically in FIG. 5C; for clarity of explanation, neither air inlet nor nozzle is shown in this figure. The blades 531 and 532 are attached respectively to a separation wall 513 and a side wall 518, and both are attached to a central member 533. The major blade dimensions are their total length $L_v$, the center length $L_c$ and the twisting angle $\beta_v$. The total length $L_v$ is preferably just slightly less than the channel length $L_{ch}$, or may vary from about 2 cm to about 20 cm. On the contrary, the center length $L_c$ should be sufficiently short to intensify generated vortices. The preferred values of $L_c$ are below a quarter of the center length $L_v$ or from zero to about 5 cm. For the considered four-blade configuration as in FIGS. 5A and 5B, the twisting angle $\beta_v$ may vary from 3° to 90°. The larger the angle, the more intensive vortices seem to be produced. However, increasing $\beta_v$ increases shadowing of a channel cross-section and aerodynamic resistance of SSVG which may reduce the air rate through the generator. It is well-known that generators of small-scale turbulence like a turbulent grid 315 in FIG. 3A are the most efficient at the area shadowing from about 10% to about 30% which is adopted as the preferred shadowing of the present invention. More important, airflow may separate from the blades when $\beta_v$ exceeds about 19° thus the preferred twisting angle $\beta_v$ is from about 10° to 17°. In particular, SSVG in FIGS. 3C, 3D and 5 has the twisting angle $\beta_v$ of 15°.

The central member 533 in FIG. 5C supports the blades and improves the channel aerodynamics. Its smooth front tip 534 increases an air rate towards vortex-producing elements and a rear cylindrical tail 535 increases air speed on the elements by narrowing the channel cross-section. The major dimensions of the central member are a length $L_t$ of its front tip 534 and a diameter $d_t$ of the tail 535. The $L_t$ may vary from about 2% to 10% of the channel length $L_{ch}$ or from about 0.1 cm to about 2 cm. The diameter $d_t$ may vary from about 2% to 25% of the channel height H or from about 0.2 cm to about 2 cm.

Two more dimensions are noteworthy. FIG. 2C shows a channel of a height H where a roof 231 is lifted to the height $\Delta H$ above a wall 233 and a vortex-producing element 234 by supports 235. The preferred value of $\Delta H$ should not exceed the channel height H or vary from zero to about 7 cm. Another important dimension is a twisting angle $\beta_1$ of the helically twisted blade. If only one such blade is installed in a channel as 234 in FIG. 2C, the preferred angle $\beta_1$ may vary from about 20° to about 90°.

Figure 8B:
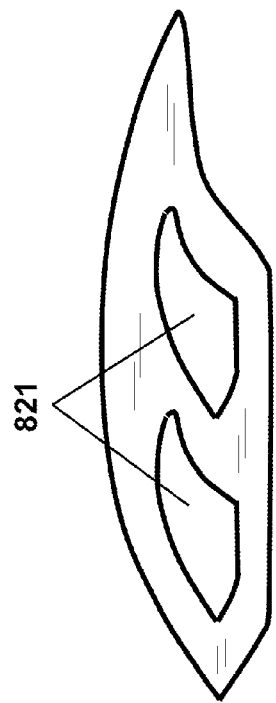
FIGS. 8A-8C show general views of wingtips.

The second part of the present invention are conceptually new fairing devices for more efficient reduction in air drag of vehicles than that produced by existing fairings. The preferred embodiments of the devices are described with reference to the drawings in FIGS. 6-8.

Figure 6A:
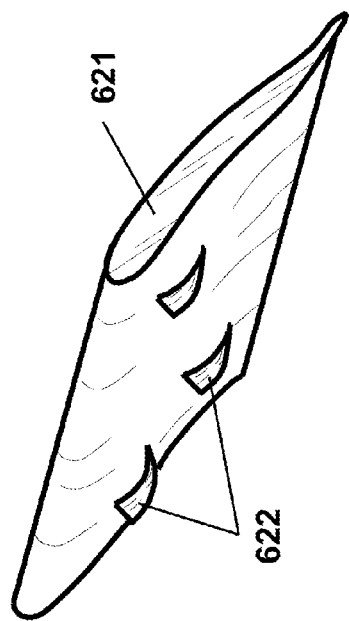
FIGS. 6A-6D show general views of a fairing device according to the present invention.
Figure 6B:
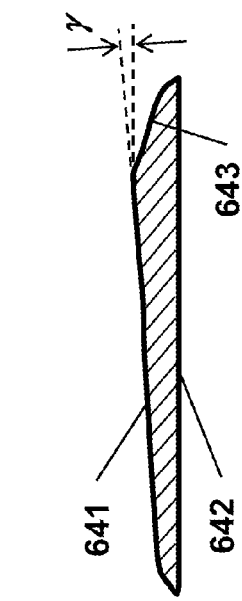

New fairing devices of the present invention may comprise any type of an existing fairing and a predetermined sub-set of SSVG attached to its lower or/and upper surface. Several typical embodiments of such devices are shown in FIG. 6. FIG. 6A shows the rear end 611 with cargo doors 612 of a typical trailer with a fairing device of the present invention at the trailer tail. The device comprises typical trailer base fairings 613 with a set of existing SSVG of a triangular shape 614 attached to the upper surface of the fairings. Another embodiment is shown in FIG. 6B and it comprises a typical rear spoiler 621 with typical curved fins 622 attached to the lower surface of the spoiler.

New fairings of the present invention may also generate small-scale vortices by themselves. To produce a sheet of intensive vortices, such new fairings are of a bluff shape and/or with bluff obstructions on the upper and/or lower surfaces and/or slots in a body of a fairing in contrast to aerodynamically smooth existing fairings such as 613 in FIGS. 6A and 621 in FIG. 6B. Generic cross-section views of new fairings of the present invention are shown in FIG. 7. The new fairings may have a head of an aerodynamically smooth shape as 711 in FIGS. 7A and 731 in FIG. 7C, or of a bluff shape as 721 in FIG. 7B. A tail of new fairings may be of aerodynamically smooth shape as 712 in FIGS. 7A and 722 in FIG. 7B, or of a bluff shape as 732 in FIG. 7C. Bluff obstructions may be located on the upper surface of a fairing, on the lower surface as 726 in FIGS. 7B and 735 in FIG. 7C, or on both surfaces of a fairing as 715 and 716 in FIG. 7A. Those obstructions may be vortex-generating means of any type such as bumps, ribs, serrated plates, twisted or curved fins or plates and the like. A new fairing device with vortex-producing slots is described below with reference to FIG. 9D. The fairing's lower surface may be tilted towards a vehicle's surface as 714 in FIG. 7A, away from the surface as 724 in FIG. 7B, or be parallel to the surface as 734 in FIG. 7C. Intensity and lifespan of vortices generated by such new fairing may be further increased by attaching a predetermined sub-set of SSVG to its lower or/and upper surface.

In the contents of the present invention, SSVG attached to or embedded into new fairing devices serve as vortex-producing elements and thus may be of any configuration including conceptually new SSVG of the present invention, existing SSVG developed for any applications, or newly developed generators. The attached SSVG may be aligned with the fairing transverse axis as 614 in FIG. 6A or create an arbitrary pattern as 622 in FIG. 6B. SSVG may be located anywhere on fairing surfaces although locations near the fairing rear edge are more efficient and thus preferred.

Figure 6D:
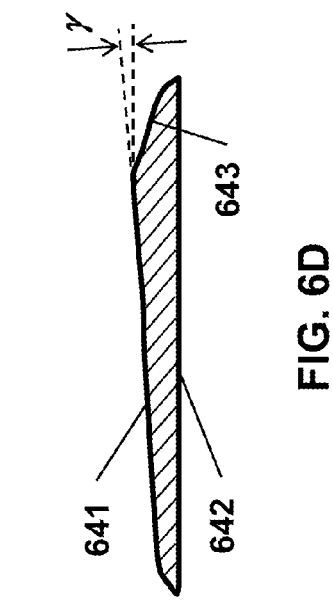
Figure 6C:
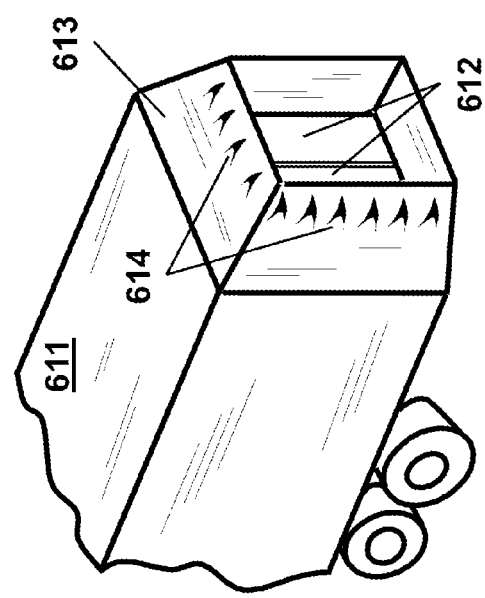

As shown in FIG. 6C, the new fairing devices may also comprise any type of an existing aerodynamically smooth fairing or the new vortex-generating fairing 631 as the upper component and the lower component 632 with a predetermined sub-set 633 of SSVG of any type between the components. The lower component 632 may be just a holder of any type, an existing fairing of any type, a new vortex-generating fairing of the present invention and the like. If the lower component is a fairing of any type, the upper component 631 may be just a cover of any type, an existing fairing of any type, a new vortex-generating fairing and the like. If the lower component is used together with the upper fairing, its upper surface 641 may be angled with respect to the vehicle's surface 642 as in FIG. 6D. The tilting angle γ varies preferably from zero to about 10°. Zero γ corresponds to the upper surface 641 of the lower component being parallel to the vehicle surface 642. The tail of the lower component may be of smooth shape as 643 in FIG. 6D or of bluff shape. The upper component 631, the lower component 632 or both may be solid as illustrated in FIGS. 6B, 6D and 7, or hollow inside.

Figure 8C:
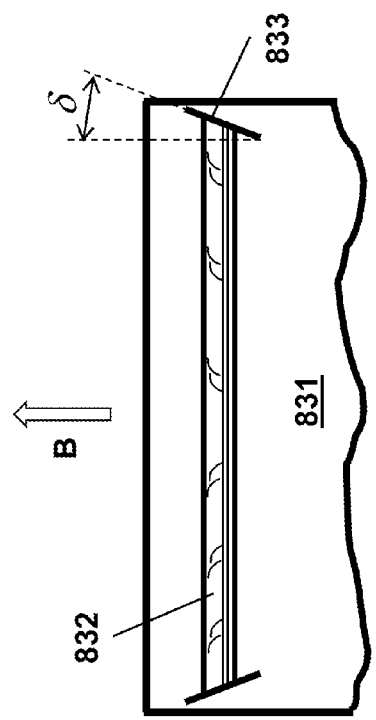
Figure 8A:
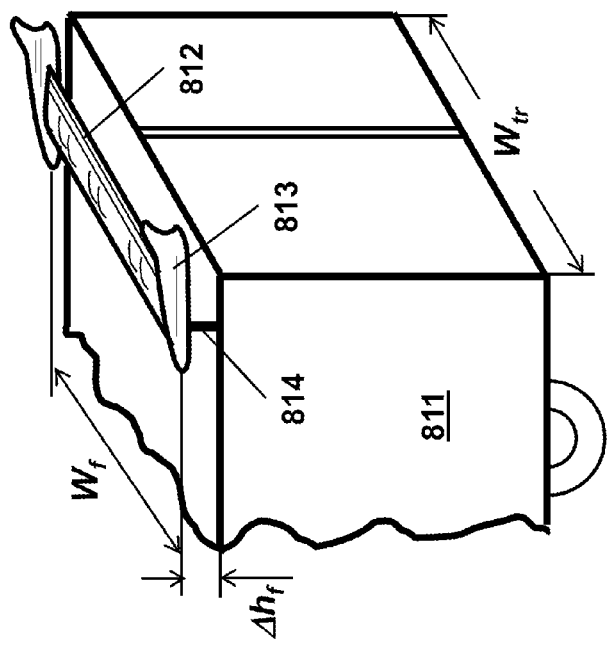

The novel fairing devices of the present invention may have wingtips for further enhancing their performance and protecting a fairing from mechanical damage. A new fairing device 812 with a wingtip 813 is illustrated in FIG. 8A. The wingtips may be solid as in FIG. 8A or have holes of any shape for enhancing further the performance of fairing devices as 821 in FIG. 8B. Wingtips on new fairing devices may be angled with respect to the driving direction. It is illustrated in FIG. 8C showing the rear roof end 831 of a typical cargo trailer with a new fairing 832 and wingtips 833 angled with respect to the driving direction indicated by arrow B. The preferred values for an angle δ are from about −5° to about 20°.

New fairing devices of the present invention may be mounted on a vehicle surface or separated from the surface. Fairing devices 922 and 923 mounted on a vehicle surface at the rear roof edge and the rear side wall edges of a typical cargo trailer 921 are illustrated in FIG. 9B. FIG. 8A illustrates new fairing device 812 mounted on a typical cargo trailer 811 at the rear edge of a trailer roof. The device is lifted above the roof surface by supports 814.

The novel fairings of the present invention are characterized by three major dimensions: the length $L_f$ in FIG. 7A, and the width $W_f$ and the separation $\Delta h_f$ from the surface in FIG. 8A. The most effective values of a length and a width depend on a vehicle type and a location of the fairing on a vehicle. For typical heavy cargo vehicles, the preferred length $L_f$ varies from about 5 cm to about 30 cm. The most efficient magnitude for the width $W_f$ is the transverse size of a targeted drag-producing volume which is the trailer width $W_{tr}$ in the case in FIG. 8A. The preferred values of $W_f$ for typical heavy cargo vehicles vary from about half-a-meter to about 3 m. The preferred value of $\Delta h_f$ should not exceed the length $L_f$, or vary from zero to about 30 cm.

The third part of the present invention is a new system for significant reduction in air drag and mitigation of detrimental side wind effects for vehicles moving through air or water. The preferred embodiments of the system are described with reference to the drawings in FIGS. 9-11. The system comprises a plurality of assemblies mounted on a vehicle in appropriate locations. Each assembly may comprise a predetermined sub-set of conceptually new SSVG of the present invention, conceptually new fairing device of the present invention, or any combination of those.

Representative examples of assemblies of the present invention are shown in FIG. 9 where arrows B indicate the driving direction. FIG. 9A shows the rear end 911 of a typical cargo trailer with assemblies comprising SSVG of the present invention. The generators 912 are mounted at the rear edge of a trailer roof, generators 913 at the rear edge of a trailer side walls and generators 914 at the sides of a trailer roof. Assemblies comprising a conceptually new fairing device of the present invention such as shown in FIG. 6C are illustrated in FIG. 9B where new fairing devices 922 and 923 are positioned on the rear edges of a trailer 921.

The assemblies may be attached to a vehicle as in FIGS. 9A and 9B and/or be installed by a vehicle manufacturer as parts of a vehicle body in some locations or throughout the vehicle. FIG. 9C shows the rear end 931 of a typical cargo trailer with a manufacturer-installed assembly 932. An assembly 932 comprises a plurality of typical arcuate vanes 933 with any vortex-producing elements 934 inside the vanes. An example of the vane cross-section is shown in FIG. 4B where vortex-producing elements 934 are shown as externally powered electrical turbines 424. Vortex-producing elements 934 may also be the flow-moving ones as 223, 224 in FIG. 2B or of any other configuration including but not limited to those described in the first part of the present invention and illustrated in FIGS. 2-5. Similarly to the fairing devices, assemblies of the present invention may be mounted on a vehicle surface as in FIGS. 9A and 9B, or separated from the surface similar to a new fairing 812 in FIG. 8A. The preferred value of separation $\Delta h_f$ for assemblies is the same as for the fairings, or it may vary from zero to about 30 cm.

Figure 9D:
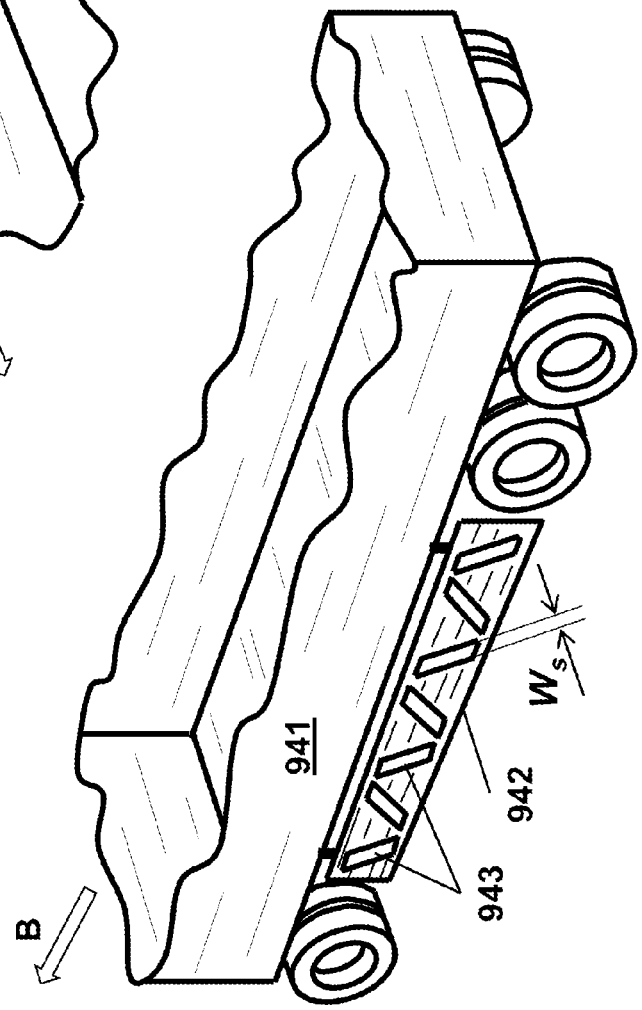

FIG. 9D shows the lower part of a typical cargo trailer 941 with a fairing device of the present invention 942 mounted underneath a trailer. General configuration of a device 942 is similar to that of typical aerodynamic trailer skirts. A device 942 streamlines airflow as conventional skirts and, in addition, generates small-scale vortices for significantly more efficient reduction in an air drag underneath a trailer. The vortices are generated by tilted rectangular slots 943. Slots of a shape of a narrow rectangular are shown only as illustration and may be of any configuration appropriate for generating small-scale vortices in outgoing airflow such as elliptical, triangular, pentagonal, ornamental and the like. The smallest dimension of slots, which is the width $W_s$ in FIG. 9D, is preferably of the order of magnitude smaller than a characteristic transverse size of a targeted drag-producing volume, or from about 2 cm to about 20 cm for heavy cargo vehicles. It is well-known that turbulent grids as 315 in FIG. 3A are efficient vortex-producing elements at the shadowing of the grid cross-section area as small as 10% or less. It means that vortex-producing slots in fairing devices of the present invention may occupy 90% or less of the area of a fairing which provides considerable reduction in a weight of the device. Vortex-generating slots 943 may be positioned inside a fairing 942 as illustrated in FIG. 9C, or the slots may go throughout the fairing body to form a fence-like lightweight construction. In addition to significantly improved drag reduction with respect to existing trailer skirts at no side winds, a fairing device 942 of the present invention greatly mitigates detrimental impact of side winds which existing solid skirts are unable to provide. Artistically designed slots may also improve an external appearance of a fairing device 942.

Figure 10A:
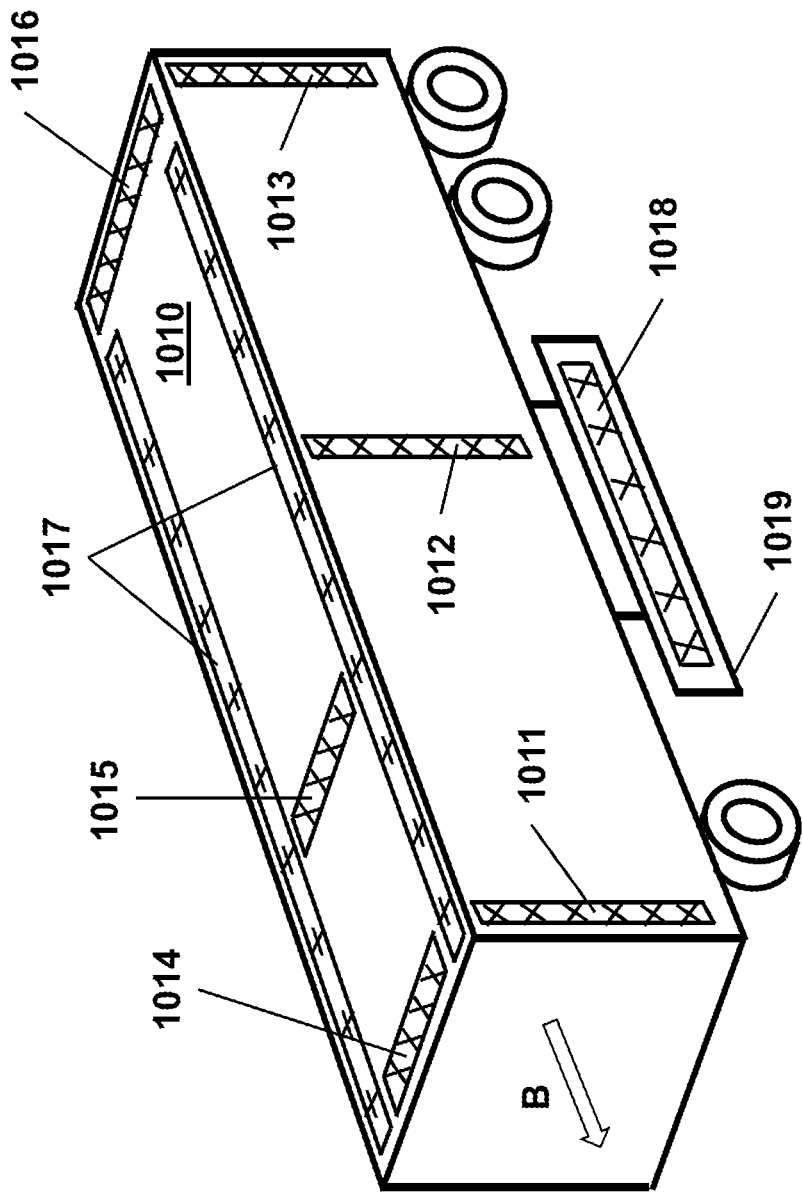
FIGS. 10A-10C are diagrammatic views indicating appropriate locations of new assemblies on motor vehicles.
Figure 10B:
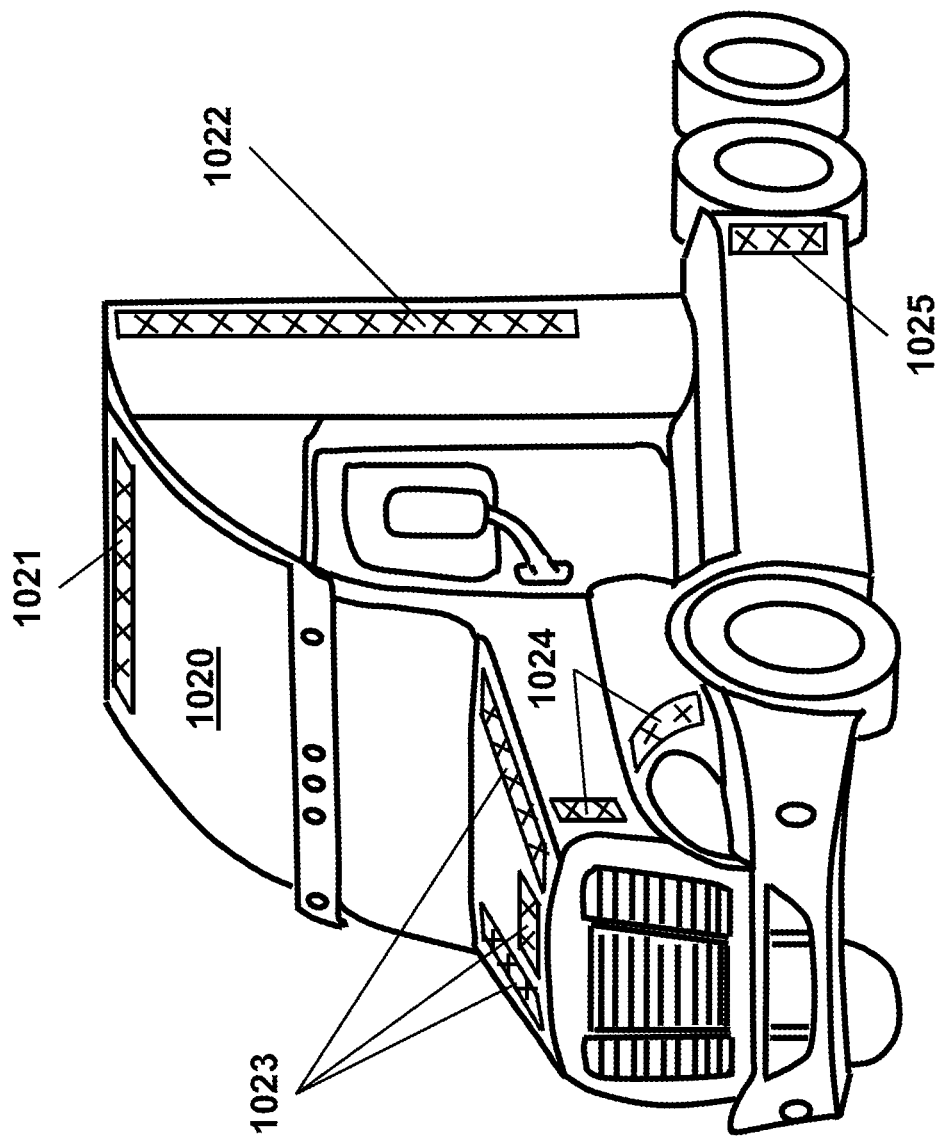
Figure 10C:
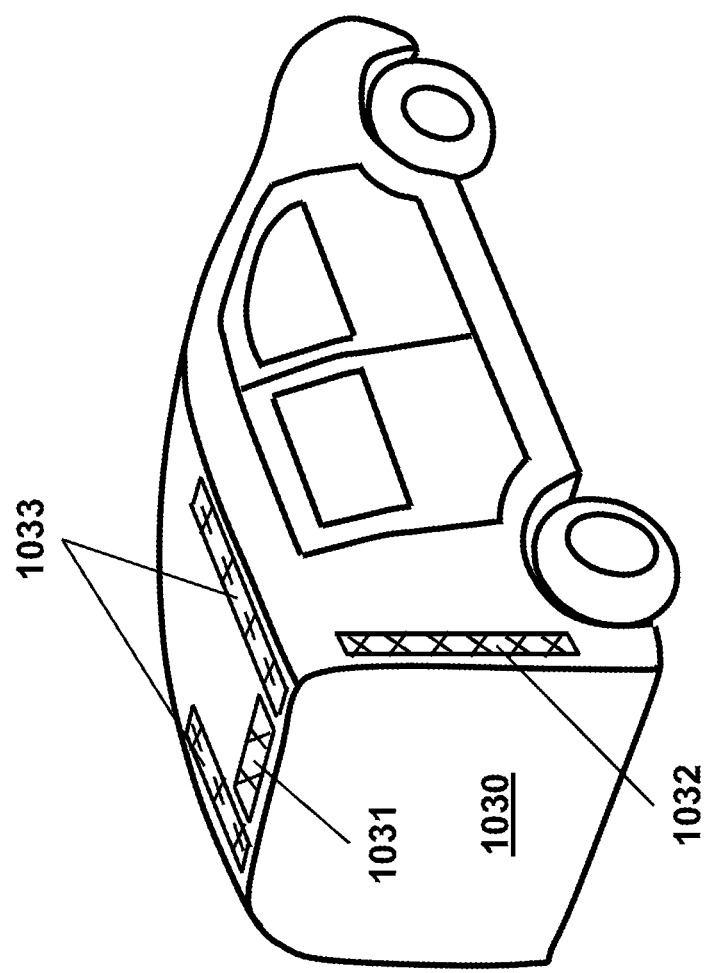

In the contents of the present invention, the appropriate locations are defined as any locations on a vehicle surface or near the surface where assemblies of the present invention may reduce air drag in targeted drag-producing volumes. To achieve this goal, the assemblies may be installed in front of targeted drag-producing volumes or inside the volumes. Representative examples of such locations are shown in FIG. 10. FIG. 10A shows a typical cargo trailer 1010 where arrow B indicates the driving direction and the rectangular boxes with crosses indicate the locations where assemblies of the present invention may be installed for significant reduction in air drag and mitigation of detrimental effects of side winds. Such locations include although are not limited by 1011-1013 on the trailer sides, 1014-1017 on the trailer roof and 1018 underneath a trailer. The assembly 1018 is attached to a trailer by a support 1019 which may be of any construction corresponding to applied assembly and location on a vehicle. FIG. 10B illustrates a modern tractor 1020 of aerodynamically efficient shape and the rectangular boxes with crosses indicate appropriate locations for assemblies of the present invention. Such locations are 1021 and 1022 on the rear edges of the tractor roof extender and side fairings, 1023 on the hood, 1024 on the front edge, and 1025 on the trailing edge of the fuel tank fairing. Assemblies may also be mounted in front of a tractor radiator using proper supports. FIG. 10C shows preferred locations on a typical SUV 1030 such as 1031, 1033 on a roof and 1032 on the rear side edges. Assemblies of the present invention may also be mounted in other appropriate locations such as underneath surfaces of passenger cars, racing sports cars and the like.

Different assemblies comprising predetermined sub-sets of SSVG of the present invention or new fairing devices of the present invention may be mounted on the same vehicle in different locations. Said assemblies may have a means for protecting a vehicle surface such as an underneath layer of rubber, plastic and the like. An assembly may include a supporting holder for being mounted outside a vehicle surface such as underneath a trailer, in front of a tractor radiator and the like as 1019 in FIG. 10A.

If an assembly contains a sub-set of SSVG, separations between individual SSVG in the assembly may be fixed or variable and the SSVG may be mounted at fixed or variable angles with respect to the driving direction as well as to each other. For illustration purposes only, preferred dimensions for mounting SSVG of the present invention for typical heavy cargo trucks are discussed below with reference to FIG. 11. The dimensions are provided for SSVG similar to the most efficient SSVG of the present invention in FIGS. 3C and 3D which are mounted either individually as 912-914 in FIG. 9A or as a part of the new fairing device of the present invention as in FIG. 9B. The dimensions for other types of SSVG may be chosen accordingly.

Figure 11B:
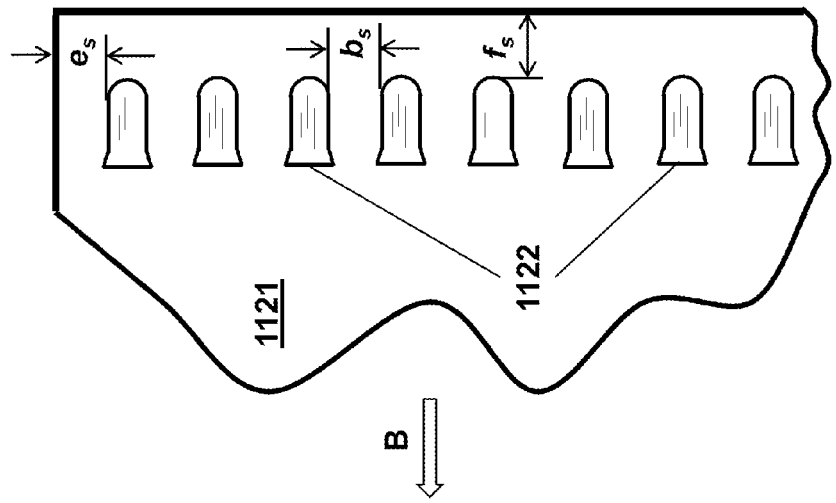
FIGS. 11A and 11B illustrate preferred dimensions for mounting SSVG of the present invention on heavy cargo trucks.
Figure 11A:
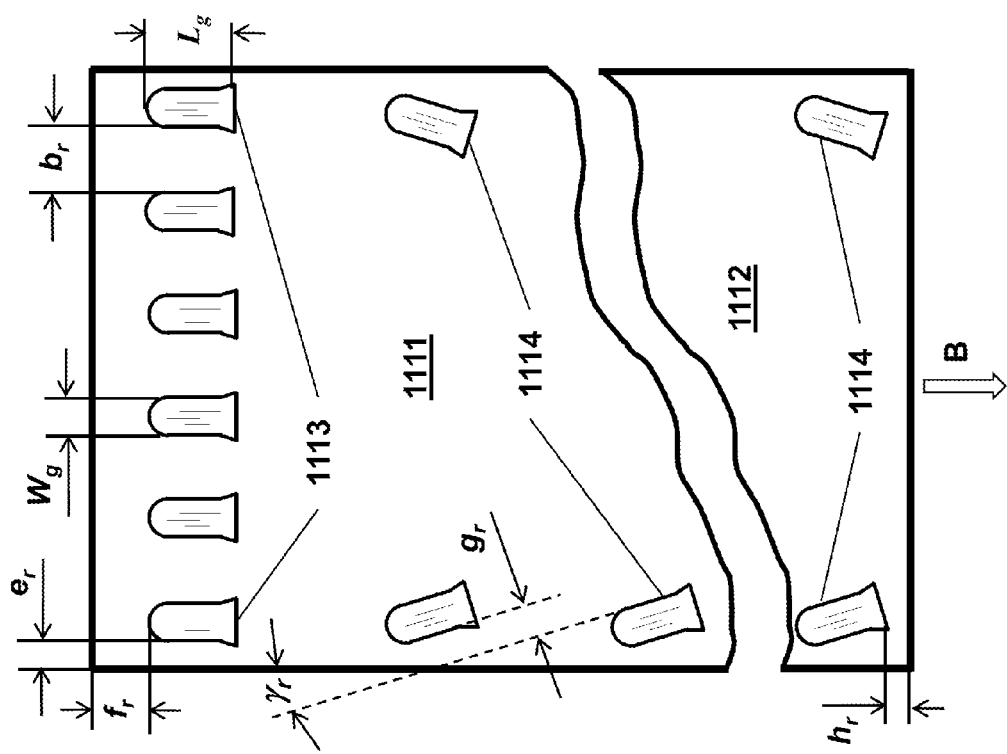

FIG. 11A shows the rear 1111 and the front 1112 ends of a roof for a typical cargo trailer. The figure further shows SSVG of the present invention 1113 on the rear edge of a roof and 1114 of the roof side edges. The generators 1113, 1114 in FIGS. 11A and 1122 in FIG. 11B have the length $L_g$ and the channel width $W_g$.

For illustration purpose only, all SSVG 1113 are aligned with the driving direction indicated by the arrow B. In general, individual generators may be mounted at fixed or variable angles with respect to the driving direction as well as to each other. Position of rear generators 1113 on a trailer is characterized by the following major dimensions: separation between the adjacent generators $b_r$, displacement from the rear trailer edge $f_r$ and displacement from the side edges $e_r$. The most efficient magnitude of the separation $b_r$ varies from about one to about two channel width $W_g$, or from about 1 cm to about 30 cm. The most efficient displacements $e_r$ of SSVG from the side edges of a vehicle are as small as practically possible although $e_r$ may be up to about two generator width $W_g$, or from zero to about 30 cm. The most efficient displacement $f_r$ of SSVG from the rear edge of a vehicle is also as small as practically possible although it may be as large as about four generator lengths $L_g$, or vary from zero to about 60 cm.

Position of side generators 1114 on a trailer roof is characterized by the following major dimensions: the orientation angle $\gamma_r$ with respect to the driving direction, separation between the adjacent generators $g_r$ and displacement from the trailer front edge $h_r$. SSVG 1114 on the roof side edges are preferably oriented to face a chosen stable side wind at a chosen cruise vehicle speed. The angle may be defined, for example by the following rule of thumb: the tangent of $\gamma_r$ is approximately equal to the ratio of a chosen speed of a stable cross wind to a chosen vehicle cruise speed. As an example, the angle $\gamma_r$ of approximately 17° is shown in FIG. 11A. It is equal to the entering angle $\beta_{in}$ of the air inlet 514 in FIG. 5A and corresponds to a stable cross wind up to 30 km/h at a vehicle cruise speed of about 100 km/h. In general, $\gamma_r$ may vary from zero to about 60° depending on vehicle's operational conditions. The most efficient separation $g_r$ varies from about one-half to about one-and-half channel width $W_g$, or from about 1 cm to about 20 cm. The most efficient displacement $h_r$ of SSVG 1114 from the front edge of a vehicle is from about one-quarter to about one-and-half generator lengths $L_g$, or from about 1 cm to about 20 cm.

FIG. 11B shows the rear end 1121 of a side wall for a typical cargo trailer. For illustration purpose only, all SSVG 1122 on the wall are aligned with a driving direction indicated by the arrow B. Similar to SSVG 1113 on the rear roof end, individual generators 1122 may be mounted at fixed or variable angles with respect to the driving direction as well as to each other. Position of side wall generators 1122 on a trailer is characterized by the following major dimensions: separation between the adjacent generators $b_s$, displacement from the rear trailer edge $f_s$ and displacement from the top edge $e_s$. The most efficient magnitudes of those characteristics are the same as respective values for the generators 1113, namely the separation $b_s$ may vary from about one to about two channel width $W_g$ or from about 1 cm to about 30 cm, the displacement $e_s$ may be up to about two generator width $W_g$ or from zero to about 30 cm, and the displacement $f_s$ may be up to about four generator lengths $L_g$ or vary from zero to about 60 cm.

The fourth part of the present invention is a sub-system for fast and easy attaching to and detaching from a vehicle SSVG of the present invention or/and other small devices. The preferred embodiments of the sub-system are described with reference to the drawings in FIGS. 12-14. A sub-system of the present invention comprises housing for bearing SSVG or/and other devices and tie-down component for attaching the housing to and removing it from a vehicle.

Figure 12:
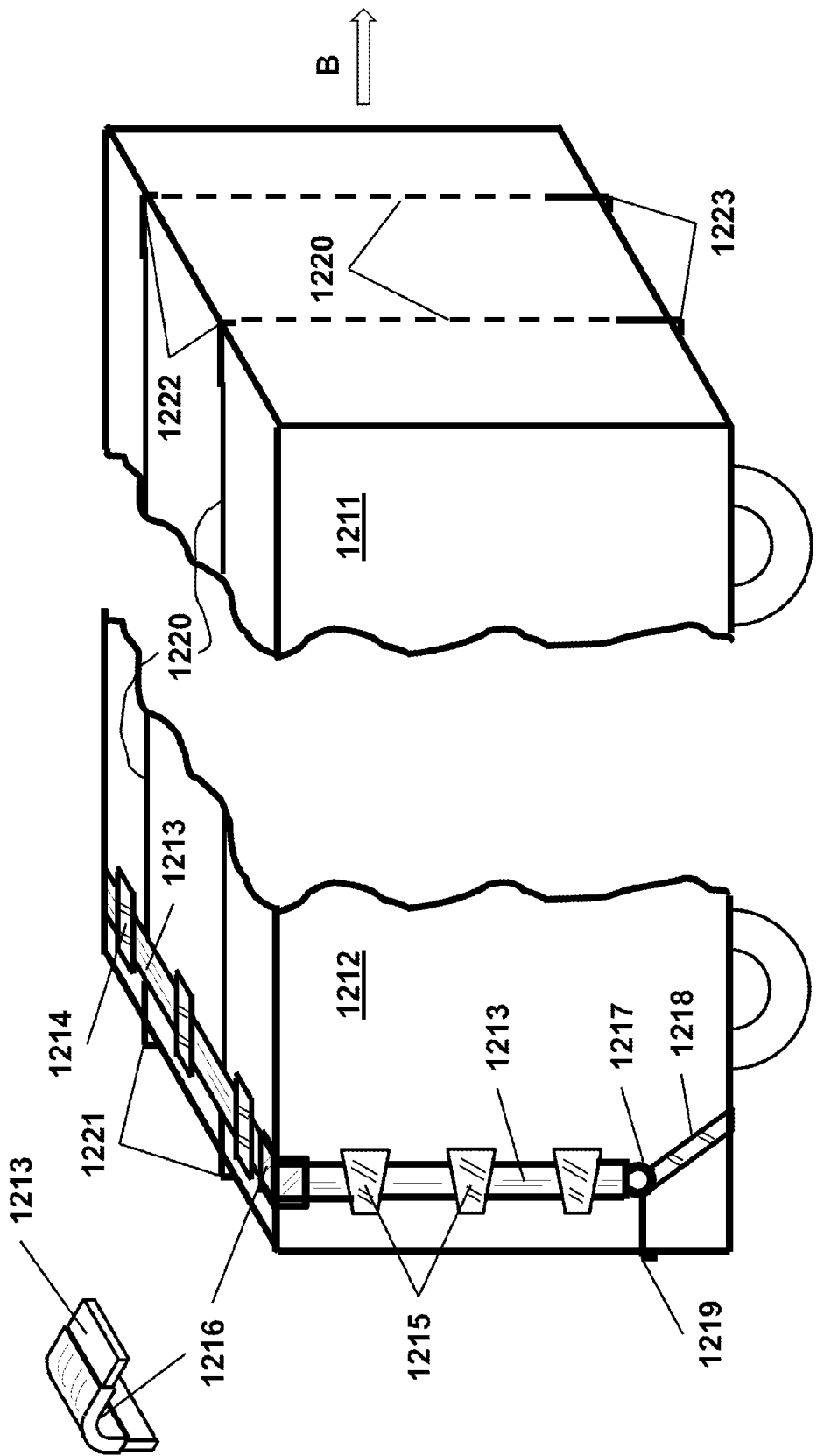
FIG. 12 shows a general prospective front view of an attachment sub-system for attaching/detaching devices to a vehicle according to the present invention.

The housing comprises at least the lower component with devices attached to its upper surface. Such an embodiment is illustrated in FIG. 12, which shows the front end 1211 and the rear end 1212 of a typical cargo trailer where arrow B indicates the driving direction. In this figure a housing of the present invention is shown as a flexible belt 1213, for example from nylon or other durable lightweight material, with devices 1214 and 1215 on its upper surface.

Figure 13:
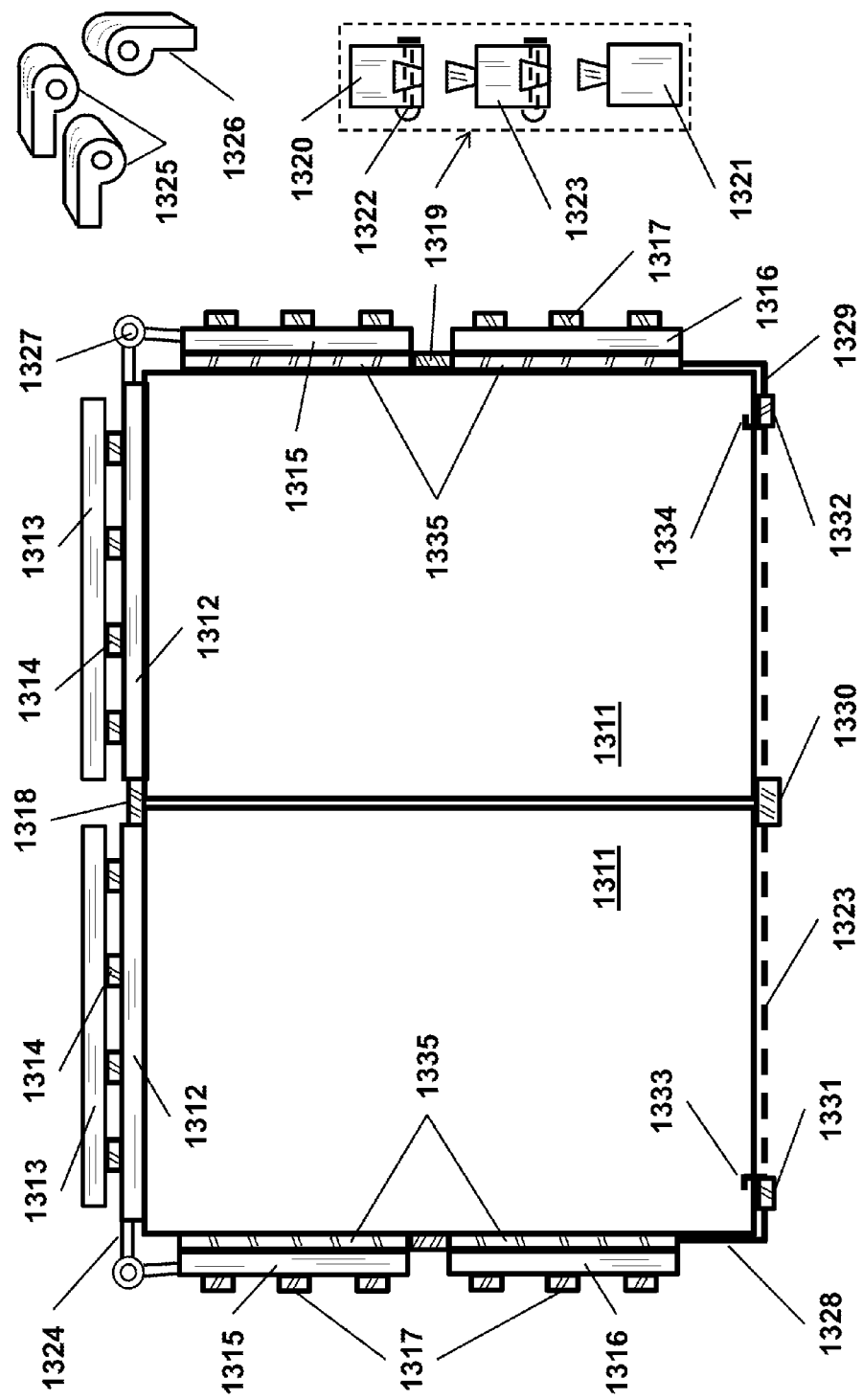
FIG. 13 is a general rear view of the sub-system.

The housing may also have the lower and the upper components with devices attached between the components. Such embodiment is illustrated in FIG. 13 which shows the back view of a typical trailer with the cargo doors 1311. In this figure the housing of the present invention on the rear edge of a trailer roof is shown as a pair of segments consisting of the lower components 1312 and the upper components 1313 with devices 1314 between the components.

The lower and the upper components may be flexible constructions of adjustable length such as belts, caterpillar tracks, chains and the like as illustrated by a belt 1213 in FIG. 12. A belt 1213 may go through corner buckles like 1216 for preventing uneven tension and possible damage due to rubbing against a sharp trailer edge. The components may also be rigid constructions as illustrated in FIG. 13 where segments 1312 and 1313 and 1315 and 1316 may be from metal, plastic or any other lightweight durable material. In particular, all or any of these segments may be new fairing devices of the present invention like that in FIG. 6C in which case the devices 1314 and/or 1317 are SSVG.

The housing may also comprise a combination of separated flexible and/or rigid segments. The segments may have flexible and/or rigid center and/or corner connectors of adjustable length. Rigid center connectors 1318 and 1319 are illustrated in FIG. 13 and consist of two elements 1320 and 1321 which may be slotted into one another and fixed by a pin 1322. The length of such connectors may be adjusted, for example by inserts like 1323. The center and corner connectors may allow a housing to be folded for storage and transportation. The foldable corner connectors 1324 are illustrated in FIG. 13 and consist of ear-like elements 1325 and 1326 connected by a pin 1327. Connectors 1324 allow folding of rigid roof segments 1312, 1313 with rigid side segments 1315.

Another foldable center connector with adjustable length is illustrated in FIG. 14A. The figure shows the top view of a roof housing consisting of two segments 1411 and 1412 with devices 1413 attached to the upper surfaces (only two devices are shown). The center connector consists of locking tracks 1414 and 1415 which can be moved into segments through respective slots 1416 and 1417 for adjusting the length of housing and then locked in chosen positions by bolts 1418. Tracks 1414 and 1415 are connected by a double-hinge 1419 with axes 1420. The hinge allows folding the rigid segments as illustrated by the side view in FIG. 14B.

The tie down component for attaching/detaching housing with SSVG or/and other devices to a vehicle may be a part of the lowest segments of the housing or it may be connected to the segments by rings or other similar means. A tie-down component may be a flexible belt from durable lightweight material as 1213 in FIG. 12. The belt may be connected to the bottom of housing by the O-ring 1217 and protected from sliding forward by a hook 1219. As illustrated further in FIG. 13, the lower ends of the belt 1328 and 1329 may be connected around the underside of a trailer and tightened by the ratchet strap 1330. If two separate ratchet straps 1331 and 1332 are used, each of them may be tighten to designated places in a trailer undercarriage using hooks 1333 and 1334.

The housing may include variable means for increasing its structural strength, for example steel wires may go throughout a flexible belt 1213 in FIG. 12. The housing may include variable means for protection from moving in the forward/backward directions like safety straps. An example of such straps 1220 is shown in FIG. 12. The straps are connected to the housing 1213 and prevent it from moving in the forward direction by back hooks 1221. Front hooks protecting housing from moving in the backward direction may be fixed on the top of a trailer front as 1222 or on the bottom as 1223. The sub-system may further include variable means for protecting a vehicle surface like springs, rubber or plastic underneath layers. An example of an underneath rubber layer 1335 is shown in FIG. 13.

The housing may carry only one type of devices such as SSVG or/and any combination of different devices. For example, all devices 1314 and 1317 in FIG. 13 may be of the same type. Devices 1315 in FIG. 12 may be SSVG of the present invention and devices 1214 in the same figure may be warning lights. A housing may be combined with a plug-in wiring harness should any electrical power for the devices be necessary. A number, positions and a type of devices such as 1214, 1215 in FIG. 12, 1314, 1317 in FIGS. 13 and 1413 in FIGS. 14A, 14B may be preset or variable. SSVG of the present invention or/and other devices may be mounted on a housing permanently or attachable and lockable in predetermined positions. Devices may be attached to housing by any standard or newly developed means like pins, screws, rivets, glue and the like.

The sub-system may include auxiliary aiding tools for placing housing on and removing it from a trailer roof and sides. An example of such tool is shown in FIG. 14C and it consists of a telescopic bar 1431 with a handle 1432. The roof segments of a housing 1433 with devices 1334 may be placed on a support 1435 and easily lifted to the roof by rolling a wheel 1436 on trailer doors.

The invention claimed is:

1. A land vehicle configured to move relative to surrounding air and being subject to an air drag due to a relative velocity between the vehicle and the air, the land vehicle comprising:
a body with a surface subject to an air flow as the vehicle moves relative to the surrounding air;
a vortex flow generating device on the surface of the vehicle configured to substantially reduce the air drag as the vehicle moves relative to the surrounding air, said vortex flow generating device comprising:
a vortex-generating element on the surface of the vehicle subject to air flow having a given velocity relative to the surface as the vehicle moves relative to the surrounding air, said element being disposed to face into the air flow;
said vortex-generating element having at least one wall generally extending in a direction of the air flow and in an upward direction and said at least one wall being shaped to impose on the flowing air a vorticity component, the upward direction being defined by a surface normal to the surface of the vehicle that is subject to the air flow; and
a boundary wall forming a roof for said vortex-generating element separate from said vortex-generating element, said roof being disposed and configured to form a confined flow channel together with said at least one wall of said vortex-generating element and to limit an upward flow of the air upwardly away from said vortex-generating element and upwardly away from the surface of the vehicle;
wherein said vortex-generating element is mounted rigidly and immovably relative to said roof defined by said boundary wall, and said confined flow channel has a forward opening facing into the air flow and a rear opening;
wherein the air enters said forward opening having an energy substantially defined by a mass and a speed of the air flow, and the air exits the rear opening in a vortex flow having an energy substantially defined by the mass, the speed of the air flow, and a rotational velocity of the vortex flow exiting said rear opening.

2. The vortex flow generating device according to claim 1, wherein said boundary wall is disposed to enclose said vortex-generating element, and said boundary wall has a funnel-shaped inlet facing into the air flow.

3. The vortex flow generating device according to claim 1, wherein said boundary wall encloses said vortex-generating element and said boundary wall has a flow guide disposed generally to divert a direction of an air flow through said flow channel in a direction transversely to the direction of the air flow.

4. An assembly for reducing aerodynamic drag acting on a vehicle while the vehicle is moving relative to a surrounding air, the vehicle having at least one bluff edge downstream of which a drag-producing volume of a relatively lower air pressure is formed as compared to remaining zones surrounding the vehicle, the assembly comprising:

at least one vortex flow generating device according to claim 1 strategically disposed to generate a vortex flow and to expel the vortex flow towards the drag-producing volume and to thereby reduce an extent of the drag-producing volume and to reduce an aerodynamic drag of the vehicle.

5. The assembly according to claim 4, wherein said at least one vortex flow generating device is one of a multiplicity of vortex flow generating devices strategically disposed on the vehicle.

6. A land vehicle configured to move relative to surrounding air and being subject to an air drag due to a relative velocity between the vehicle and the air, the land vehicle comprising:
- a body with a surface subject to an air flow as the vehicle moves relative to the surrounding air;
- a vortex flow generating device on the surface of the vehicle configured to substantially reduce the air drag as the vehicle moves relative to the surrounding air, said vortex flow generating device comprising:
- a vortex-generating element on the surface of the vehicle subject to a fluid air flow having a given velocity relative to the surface as the vehicle moves relative to the surrounding air, said element being disposed to face into the air flow;
- said vortex-generating element having at least one wall generally extending in a direction of the air flow and in an upward direction and said at least one wall being shaped to impose on the flowing air a vorticity component, the upward direction being defined by a surface normal to the surface of the vehicle that is subject to the air flow; and
- a boundary wall forming a roof for said vortex-generating element separate from said vortex-generating element, said roof being disposed and configured to form a confined flow channel together with said at least one wall of said vortex-generating element and to limit an upward flow of the air upwardly away from said vortex-generating element and upwardly away from the surface of the vehicle;
- wherein said vortex-generating element is adjustably mounted about a transverse axis extending perpendicularly to the direction of the air flow for adjusting a position and configuration relative to said roof defined by said boundary wall.

* * * * *